United States Patent [19]

Pellet et al.

[11] Patent Number: 4,906,351

[45] Date of Patent: Mar. 6, 1990

[54] DEWAXING CATALYSTS AND PROCESSES EMPLOYING NON-ZEOLITIC MOLECULAR SIEVES

[75] Inventors: Regis J. Pellet, Croton-on-Hudson; Jule A. Rabo, Armonk; Gary N. Long, Putnam Valley; Frank P. Gortsema, Pleasantville; Albert R. Springer, Yonkers, all of N.Y.

[73] Assignee: UOP, Des Plaines, Ill.

[21] Appl. No.: 86,234

[22] Filed: Aug. 17, 1987

Related U.S. Application Data

[63] Continuation of Ser. No. 682,942, Dec. 18, 1984, abandoned.

[51] Int. Cl.⁴ .................. C10G 47/18; C10G 11/05
[52] U.S. Cl. ............................ 208/111; 208/114; 585/640
[58] Field of Search .................. 208/111, 114; 585/640

[56] References Cited

U.S. PATENT DOCUMENTS

| | | | |
|---|---|---|---|
| Re. 28,398 | 4/1975 | Chen et al. | 208/111 |
| 4,360,419 | 11/1982 | Miller | 208/111 |
| 4,390,414 | 6/1983 | Cody | 208/111 |
| 4,431,518 | 2/1984 | Angevine et al. | 208/111 |
| 4,440,871 | 4/1984 | Lok et al. | 502/214 |
| 4,443,329 | 4/1984 | Eberly, Jr. et al. | 208/111 MC |
| 4,499,327 | 2/1985 | Kaiser | 585/640 |
| 4,512,875 | 4/1985 | Long et al. | 208/114 |
| 4,567,029 | 1/1986 | Wilson et al. | 502/208 |

FOREIGN PATENT DOCUMENTS 0059059 9/1982 European Pat. Off.

OTHER PUBLICATIONS

Derouane, "Molecular Shape-Selective Catalysis by Zeolites", *Zeolites: Science and Technology*, Martinus Nijhoff Publ., pp. 347-371, 1983.

*Primary Examiner*—Jeffrey E. Russel
*Attorney, Agent, or Firm*—Vincent J. Vasta, Jr.

[57] ABSTRACT

Dewaxing processes for hydrocarbon feedstocks are disclosed using novel catalysts comprising non-zeolitic molecular sieves, such as the silicoaluminophosphates of U.S. Pat. No. 4,440,871. The products of the instant dewaxing processes are characterized by lower pour points than the hydrocarbon feedstock.

43 Claims, 2 Drawing Sheets 4,906,351

DEWAXING CATALYSTS AND PROCESSES EMPLOYING NON-ZEOLITIC MOLECULAR SIEVES

This application is a continuation, of application Ser. No. 682,942, filed Dec. 18, 1984, now abandoned.

FIELD OF THE INVENTION

The present invention relates to dewaxing and hydrodewaxing catalysts comprising non zeolitic molecular sieves, as hereinafter described and to processes employing such catalysts.

BACKGROUND OF THE INVENTION

Dewaxing and hydrodewaxing processes are employed in the refining industry to treat petroleum fractions having initial boiling points over about 350° F. to improve the pour point. The improvement in pour point is generally effected by selective removal of paraffinic hydrocarbons. Since the pour point of liquid hydrocarbon fuels, e.g., diesel fuels and other light gas oil fractions, are strictly controlled, the pour points specification of such fuels must be met if such are to be employed in their intended use.

The need to reduce the pour point of petroleum fractions has resulted in the development of numerous dewaxing and hydrodewaxing processes wherein the pour points of petroleum fractions are reduced by selective removal of paraffinic hydrocarbons. Processes relating to dewaxing and hydrodewaxing are well known in both the patent and scientific literature. Such processes have employed crystalline aluminosilicates as catalysts. For example, see U.S. Pat. Nos. 3,140,249, 3,140,252, 3,140,251, 3,140,253, 3,956,102 and 4,440,991. These and other patents disclose the use of various crystalline aluminosilicates as catalysts for dewaxing processes.

Although a large number of zeolite materials have been disclosed as employable as catalysts for dewaxing and hydrodewaxing catalysts, the use of crystalline non-zeolitic molecular sieves has not received significant attention. This lack of attention is attributable to the scarcity of molecular sieves other than crystalline aluminosilcates. One disclosure of a catalyst containing a crystalline silicate, as opposed to a crystalline aluminosilicate, is disclosed in U.S. Pat. No. 4,441,991.

The instant invention provides for catalytic dewaxing and hydrodewaxing of hydrocarbon feedstocks by contacting such with catalysts comprising non-zeolitic molecular sieves, as hereinafter described.

SUMMARY OF THE INVENTION

Figure 1:
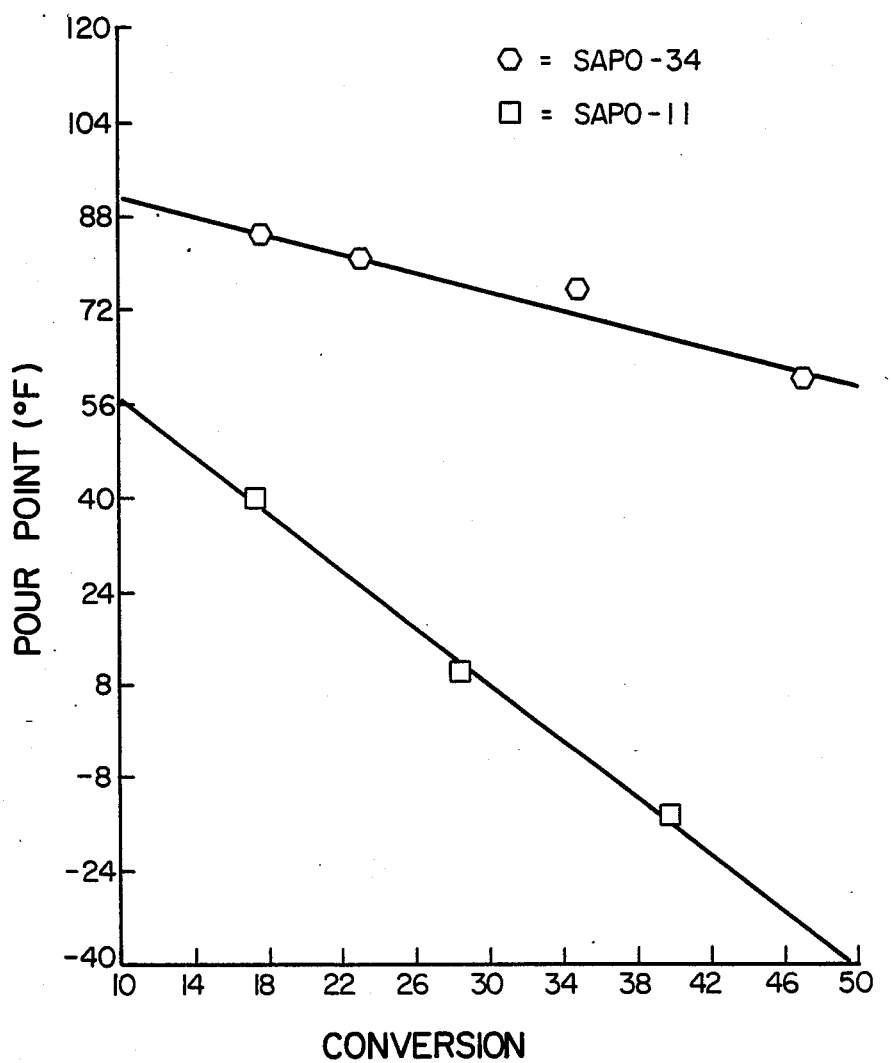
FIG. 1 is a plot of the pour point (°F.) as a function of conversion of Catalyst A (SAPO-11) and comparative Catalyst C (SAPO-34).

The present invention relates to catalytic dewaxing and hydrodewaxing (hereinafter jointly referred to as "dewaxing") processes and the catalysts employed in such processes. The catalysts comprise: (1) at least one non zeolitic molecular sieve, as hereinafter described; and (2) optionally, and in the instance of hydrodewaxing at least one hydrogenation component; and (3) optionally, particles of a traditional dewaxing catalyst having catalytic activity for dewaxing and/or hydrodewaxing hydrocarbon feedstocks at effective dewaxing conditions, e.g., particles of a traditional dewaxing catalyst containing a zeolitic aluminosilicate(s) of the type generally employed in such dewaxing catalysts. The non-zeolitic molecular sieves employed in the instant invention, i.e., catalysts and processes, are characterized in their calcined form by an adsorption of isobutane of at least 2 percent by weight at a partial pressure of 500 torr and a temperature of 20° C. The traditional dewaxing catalyst component, e.g., a zeolitic aluminosilicate, if any, is characterized as being a dewaxing catalyst component, such as heretofore traditionally employed in hydroprocessing processes, e.g., the various forms of zeolite Y, silica-alumina, and hydrogenation components. The non-zeolitic molecular sieves employed in this invention are unique in that such are not zeolitic aluminosilicates, as heretofore employed in the prior art, but are specific non-zeolitic molecular sieves, as hereinafter described.

DETAILED DESCRIPTION OF THE INVENTION

Dewaxing and hydrodewaxing processes involve converting high boiling and high pour point paraffinic waxes and hydrocarbons into lower boiling lower pour point products. Further, hydrodewaxing involves hydrogenating unsaturates in the product. The term "dewaxing" is employed herein to generally mean the removal of hydrocarbons which readily solidify from petroleum stocks as waxes and includes catalytic dewaxing and hydrodewaxing.

The catalysts of the instant invention have been observed to convert normal paraffins in the hydrocarbon products and, accordingly, reduce the pour point of such products, i.e., act as dewaxing catalysts. This reduction in the pour point by selective normal paraffin conversion is of commercial significance since distillate products have rigid specifications on the acceptable pour point.

The non-zeolitic molecular sieves employed in the instant invention are selected from the hereinafter described group of non-zeolitic molecular sieves as being characterized in their calcined form by an adsorption of isobutane of at least 2 percent by weight at a partial pressure of 500 torr and a temperature of 20° C. The non-zeolitic molecular sieves are preferably also characterized in their calcined form by an adsorption of triethylamine of from zero to less than 5 percent by weight, preferably less than 3 percent by weight, at a partial pressure of 2.6 torr and a temperature of 22° C.

NON-ZEOLITIC MOLECULAR SIEVES ("NZ-MS")

The term "non-zeolitic molecular sieves" or "NZ-MS" is defined in the instant invention to include the "SAPO" molecular sieves of U.S Pat. No. 4,440,871, "ELAPSO" molecular sieves as disclosed in U.S. Ser. No. 600,312, filed Apr. 13, 1984, now U.S. Pat. No. 4,793,984, and certain "MeAPO", "FeAPO", "TiAPO" and "FCAPO" molecular sieves. Crystalline metal aluminophosphates (MeAPOs where "Me" is at least one of Mg, M, Co and Zn) are disclosed in U.S. Ser. No. 514,334, filed July 15, 1983 now U.S. Pat. No. 4,567,029; crystalline ferroaluminophsphates (FeAPOs) are disclosed in U.S. Ser. No. 514,335, filed July 15, 1983 now U.S. Pat. No. 4,554,143; titanium aluminosphosphates (TAPOs) are disclosed in U.S. Ser. No. 480,738, now U.S. Pat. No. 4,500,651; and non-zeolitic molecular sieves ("ELAPO") are disclosed in U.S. Ser. No. 599,978, filed Apr. 13, 1984, now abandoned. Reference to figures in the description of the NZ-MSs is to the figures in said copending applications. The aforementioned copending applications are incorporated herein by reference thereto.

"ELAPSO" molecular sieves are described in copending U.S. Ser. No 600,312, filed Apr. 13, 1984, now U.S. Pat. No. 4,793,984, as crystalline molecular sieves having three-dimensional microporous framework structures of $ELO_2$, $AlO_2$, $PO_2$, $SiO_2$ oxide units and having an empirical chemical composition on an anhydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a three dimensional oxide framework, "EL" is characterized as an element having a mean "T-O" distance in tetrahedral oxide structures between about 1.51 Angstroms and about 2.06 Angstroms, "EL" has a cation electronegativity between about 125 kcal/g-atom to about 310 kcal/gm atom and "EL" is capable of forming stable M-O-P, M-O-Al or M-O-M bonds in crystalline three dimensional oxide structures having a "M-O" bond dissociation energy greater than about 59 kcal/g atom at 298° K.; and "w", "x", "y" and "z" represent the mole fractions of "EL", aluminum, phosphorus and silicon, respectively, present as framework oxides said mole fractions being within the limiting compositional values or points as follows:

| Point | Mole Fraction | | |
|---|---|---|---|
| | x | y | (z + w) |
| A | 0.60 | 0.39–(0.01)p | 0.01(p + 1) |
| B | 0.39–(0.01 p) | 0.60 | 0.01(p + 1) |
| C | 0.01 | 0.60 | 0.39 |
| D | 0.01 | 0.01 | 0.98 |
| E | 0.60 | 0.01 | 0.39 | where "p" is an integer corresponding to the number of elements "El" in the $(El_wAl_xP_ySi_z)O_2$ constituent.

The "ELAPSO" molecular sieves are also described as crystalline molecular sieves having three-dimensional microporous framework structures of $ELO_2$, $AlO_2$, $SiO_2$ and $PO_2$ tetrahedral oxide units and having an empirical chemical composition on an anhydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a framework tetrahedral oxide and is selected from the group consisting of arsenic, beryllium, boron, chromium, cobalt, gallium, germanium, iron, lithium, magnesium, manganese, titanium, vanadium and zinc; and "w", "x", "y" and "z" represent the mole fractions of "EL", aluminum, phosphorus and silicon, respectively, present as tetrahedral oxides said mole fractions being within the limiting compositional values or points as follows:

| Point | Mole Fraction | | |
|---|---|---|---|
| | x | y | (z + w) |
| a | 0.60 | 0.39–(0.01)p | 0.01(p + 1) |
| b | 0.39–(0.01 p) | 0.60 | 0.01(p + 1) |
| c | 0.10 | 0.55 | 0.35 |
| d | 0.55 | 0.10 | 0.35 | where "p" is as above defined.

The "ELAPSO" molecular sieves include numerous species which are intended herein to be within the scope of the term "non-zeolitic molecular sieves" such being disclosed in the following copending and commonly assigned applications, incorporated herein by reference thereto:

| U.S. Ser. No. | Filed | NZ—MS | U.S. Pat. No. |
|---|---|---|---|
| 600,174 | April 13, 1984 | CoAPSO | 4,749,970 |
| 600,173 | April 13, 1984 | FeAPSO | 4,683,217 |
| 600,180 | April 13, 1984 | MgAPSO | 4,758,419 |
| 600,175 | April 13, 1984 | MnAPSO | 4,686,092 |
| 600,179 | April 13, 1984 | TiAPSO | 4,684,617 |
| 600,170 | April 13, 1984 | ZnAPSO | |
| 600,168 | April 13, 1984 | CoMgAPSO | Abandoned |
| 600,182 | April 13, 1984 | CoMnMgAPSO | Abandoned |

TiAPSO Molecular Sieves

The TiAPSO molecular sieves of U.S. Ser. No. 600,179, filed Apr. 13, 1984, now U.S. Pat. No. 4,684,617, have three-dimensional microporous framework structures of $TiO_2$, $AlO_2$, $PO_2$ and $SiO_2$ tetrahedral oxide units having an empirical chemical composition on an anhydrous basis expressed by the formula:

$$mR:(Ti_wAl_xP_ySi_z)O_2$$

wherein "R" represents at least one organic templating agent present in the intracrystalline pore system; "m" represents the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of TiAPSO molecular sieves the values "w", "x", "y" and "z" in the above formula are within the limiting compositional values or points as follows:

| Point | Mole Fraction | | |
|---|---|---|---|
| | x | y | (z + w) |
| a | 0.55 | 0.43 | 0.02 |

-continued

| Point | Mole Fraction | | |
|---|---|---|---|
| | x | y | (z + w) |
| b | 0.43 | 0.55 | 0.02 |
| c | 0.10 | 0.55 | 0.35 |
| d | 0.55 | 0.10 | 0.35 |

TiAPSO compositions are generally synthesized by hydrothermal crystallization from a reaction mixture containing active resources of titanium, silicon, aluminum and phosphorus, and preferably an organic templating, i.e., structure-directing, agent, preferably a compound of an element or Group VA of the Periodic Table, and/or optionally an alkali or metal metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the TiAPSO product are obtained, usually a period of from hours to several weeks. Generally, the crystallization time is rom about 2 hours to about 30 days and typically from about 4 hours to about 20 days. The product is recovered by any convenient method such as centrifugation or filtration.

In synthesizing the TiAPSO, it is preferred to employ a reaction mixture composition expressed in terms of the molar ratios as follows:

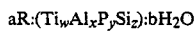

$$aR:(Ti_wAl_xP_ySi_z):bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of titanium, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing titanium, aluminum, phosphorus and silicon as framework tetrahedral oxides are prepared as follows:

Preparative Reagents

TiAPSO compositions were prepared using numerous regents. The reagents employed and abbreviations employed herein, if any, for such reagents are as follows:

(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent aqueous phosphoric acid;
(d) Tiipro: titanium isopropoxide;
(e) TEAOH: 40 weight percent aqueous solution of tetraethylammonium hydroxide;
(f) $Pr_2NH$: di-n-propylamine $(C_3H_7)_2NH$.
(g) $Pr_3NH$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$; and
(j) C-hex: cyclohexylamine.

Preparative Procedures

Preparative examples were carried out by forming a starting reaction mixture by adding the $H_3PO_4$ and the water. This mixture was mixed and to this mixture the aluminum isoproxide was added. This mixture was then blended until a homogeneous mixture was observed. To this mixture the LUDOX-LS was added and the resulting mixture blended (about 2 minutes) until a homogeneous mixture was observed.

The titanium isopropoxide was added to the above mixture and the resulting mixture blended until a homogeneous mixture was observed. The organic templating agent was then added to the resulting mixture and the resulting mixture blended until a homogeneous mixture was observed, i.e., about 2 to 4 minutes. When the organic templating agent was quinuclidine the procedure was modified such that the quinuclidine was dissolved in about one half the water and accordingly the $H_3PO_4$ was mixed with about one half the water. (The pH of the mixture was measured and adjusted for temperature). The mixture was than placed in a lined (polytetrafluoroethylene) stainless steel pressure vessel and digested at a temperature (150° C. or 200° C.) for a time or placed in lined screw top bottles for digestion at 100° C. All digestions were carried out at the autogenous pressure.

All digestions were carried out at the autogenous pressure. The products were removed from the reaction vessel cooled and evaluated as set forth hereinafter.

MgAPSO Molecular Sieves

The MgAPSO molecular sieves of U.S. Ser. No. 600,180, filed Apr. b 13, 1984, now U.S. Pat. No. 4.758,419, have three-dimensional microporous framework structures of $MgO_2^{-2}$, $AlO_2^-$, $PO_2^+$ and $SiO_2$ tetrahedral oxide units and have an empirical chemical composition on an anhydrous basis expressed by the formula:

$$mR:(Mg_wAl_xP_ySi_z)O_2$$

wherein "R" represents at least one organic templating agent present in the intracrystalline pore system; "m" represents the molar amount of "R" present per mole of $(Mg_wAl_xP_ySi_z)O_2$ and has a value from zero (0) to about 0.3; and "w", "x", "y" and "z" represent the mole fractions of magnesium, aluminum, phosphorus and silicon, respectively, present as tetrahedral oxides and each preferably has a value of at least 0.01. The mole fractions "w", "x", "y" and "z" are generally defined as being within the limiting compositional values or points as follows:

| | Mole Fraction | | |
|---|---|---|---|
| Point | x | y | (z + w) |
| A | 0.60 | 0.38 | 0.02 |
| B | 0.39 | 0.59 | 0.02 |
| C | 0.01 | 0.60 | 0.39 |
| D | 0.01 | 0.01 | 0.98 |
| E | 0.60 | 0.01 | 0.39 |

In a preferred subclass of the MgAPSO molecular sieves the values "w", "x", "y" and "z" in the above formula are within the limiting compositional values or points as follows:

| | Mole Fraction | | |
|---|---|---|---|
| Point | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

MgAPSO compositions are generally synthesized by hydrothermal crystallization for an effective time at effective pressures and temperatures from a reaction mixture containing reactive sources of magnesium, silicon, aluminum and phosphorus, an organic templating, i.e., structure-directing, agent, preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the MgAPSO product are obtained, usually a period of from several hours to several weeks. Generally, the crystallization period will be from about 2 hours to about 30 days with it typically being from about 4 hours to about 20 days for obtaining MgAPSO crystals. The product is recovered by any convenient method such as centrifugation or filtration.

In synthesizing the MgAPSO compositions, it is preferred to employ reaction mixture compositions expressed in terms of the molar ratios as follows:

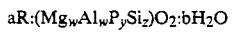

$aR:(Mg_wAl_wP_ySi_z)O_2:bH_2O$ wherein "R" is an organic templating agent; "a" is the amount of organic templating agent "R" and can have a value within the range of from zero (0) to about 6 and is more preferably an effective amount greater than zero to about 6; "b" has a value of from zero (0) to about 500, preferably between about 2 and about 300; and "w", "x", "y" and "z" represent the mole fractions of magnesium, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points as follows:

| | Mole Fraction | | |
|---|---|---|---|
| Point | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing magnesium, aluminum, phosphorus and silicon as framework tetrahedral oxides are prepared as follows:

Preparative Reagents

MgAPSO compositions were prepared using numerous regents. The reagents employed and abbreviations employed herein, if any, for such reagents are as follows:
 (a) Alipro: aluminum isopropoxide;
 (b) CATAPAL: Trademark of Condea for hydrated pseudo-boehmite;
 (c) LUDOX-LS: Trademark of DuPont for an aqueous solution of 30 weight percent $SiO_2$ and 0.1 weight percent $Na_2O$;
 (d) $Mg(Ac)_2$: magnesium acetate tetrahydrate, $Mg(C_2H_3O_2)_2 \cdot 4H_2O$;
 (e) $H_3PO_4$: 85 weight percent aqueous phosphoric acid in water;
 (f) TBAOH: tetraethylammonium hydroxide (40 wt. % in water);
 (g) $Pr_2NH$: di-n-propylamine,
 (h) $Pr_3NH$: tri-n-propylamine;
 (i) Quin: Quinuclidine;
 (j) MQuin: Methyl Quinuclidine hydroxide, (17.9% in water);
 (k) C-hex: cyclohexylamine.
 (l) TEAOH: tetraethylammonium hydroxide (40 wt. % in water).
 (m) DEEA: Diethylethanolamine;
 (n) i-$Pr_2NH$: di-isopropylamine;
 (o) TEABr: tetraethylammonium bromide; and
 (p) TPAOH: tetrapropylammonium hydroxide (40 wt. % in water).

Preparative Procedures

The MgAPSO compositions were prepared by preparing reaction mixtures having a molar composition expressed as:

$eR:fMgO:hAl_2O_3:iP_2O_5:gSiO_2:jH_2O$ wherein e, f, g, h, i and j represent the moles of template R, magnesium (expressed as the oxide), $SiO_2$, $Al_2O_3$, $P_2O_5$ ($H_3PO_4$ expressed as $P_2O_5$) and $H_2O$, respectively.

The reaction mixtures were prepared by three procedures, designated hereinafter as Methods A, B and C.

Method A

The reaction mixture was prepared by mixing the ground aluminum source (Al-ipro or CATAPAL) with the $H_3PO_4$ and water on a gradual basis with occasional cooling with an ice bath. The resulting mixture was blended until a homogeneous mixture was observed. When the aluminum source was CATAPAL the water and $H_3PO_4$ were first mixed with the CATAPAL added thereto. The magnesium acetate was dissolved in portion of the water and was then added followed by addition of the LUDOX-LS. The combined mixture was blended until a homogenous mixture was observed. The organic templating agent was added to this mixture and blended until a homogenous mixture was observed. The resulting mixture (final reaction mixture) was placed in a lined (polytetrafluoroethylene) stainless steel pressure vessel and digested at a temperature (150° C. or 200° C.) for an effective time. Alternatively, if the digestion temperature was 100° C. the final reaction mixture was placed in a lined (polytetrafluoroethylene) screw top bottle for a time. All digestions were carried out at the autogenous pressure. The products were removed from the reaction vessel cooled and evaluated as set forth hereinafter.

Method B

When method B was employed the organic templating agent was di-n-propylamine. The aluminum source, silicon source and one-half of the water were first mixed and blended until a homogeneous mixture was observed. A second solution was prepared by mixing the remaining water, the $H_3PO_4$ and the magnesium acetate. This solution was then added to the above mixture. The magnesium acetate and $H_3PO_4$ solution was then added to the above mixture and blended until a homogeneous mixture was observed. The organic templating agent(s) was then added and the resulting reaction mixture digested and product recovered as was done in Method A.

Method C

Method C was carried out by mixing aluminum iso-propoxide, LUDOX LS and water in a blender or by mixing water and aluminum iso-propoxide in a blender followed by addition of the LUDOX LS. $H_3PO_4$ and magnesium acetate were then added to this mixture. The organic templating agent was then added to the resulting mixture and digested and product recovered as was done in Method A.

MnAPSO Molecular Sieves

The MnAPSO molecular sieves of U.S. Ser. No. 600,175, filed Apr. 13, 1984 now U.S. Pat. No. 4,686,092 have a framework structure of $MnO_2^{-2}$, $AlO_2^{-}$, $PO_2^{+}$, and $SiO_2$ tetrahedra units having an empirical chemical composition on an anhydrous basis expressed by the formula:

$$mR:(Mn_wAl_xP_ySi_z)O_2$$

wherein "R" represents at least one organic templating agent present in the intracrystalline pore system; "m" represents the molar amount of "R" present per mole of $(Mn_wAl_xP_ySi_z)O_2$ and has a value of zero to about 0.3; and "w", "x", "y" and "z" represent the mole fractions of element manganese, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (w + z) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

-continued

| Point | Mole Fraction | | |
|---|---|---|---|
| | x | y | (w + z) |
| W | | | |

The values of w, x, y and z may be as follows:

| Point | Mole Fraction | | |
|---|---|---|---|
| | x | y | (w + z) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

The MnAPSOs of this invention are useful as adsorbents, catalysts, ion-exchangers, and the like in much the same fashion as aluminosilicates have been employed heretofore, although their chemical and physical properties are not necessarily similar to those observed for aluminosilicates.

MnAPSO compositions are generally synthesized by hydrothermal crystallization from a reaction mixture containing reactive sources of manganese, silicon, aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between about 50° C. and about 250° C., and preferably between about 100° C. and about 200° C. until crystals of the MnAPSO product are obtained, usually a period of from several hours to several weeks. Typical effective times of from 2 hours to about 30 days with generally from about 4 hours to about 20 days have been observed. The product is recovered by any convenient method such as centrifugation or filtration.

In synthesizing the MnAPSO compositions, it is preferred to employ a reaction mixture composition expressed in terms of the molar ratios as follows:

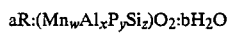

$$aR:(Mn_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of manganese, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (w + z) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |

| | Mole Fraction | | |
|---|---|---|---|
| Point | x | y | (w + z) |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing manganese, aluminum, phosphorus and silicon as framework tetrahedral oxide units are prepared as follows:

Preparative Reagents

MnAPSO compositions were prepared using numerous reagents. The reagents employed and abbreviations employed herein, if any, for such reagents are as follows:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;
(e) MnAc: Manganese acetate, $Mn(C_2H_3O_2)_2 \cdot 4H_2O$;
(f) TEAOH: 40 weight percent aqueous solution of tetraethylammonium hydroxide;
(g) TBAOH: 40 weight percent aqueous solution of tetrabutylammonium hydroxide;
$Pr_2NH$: di-n-propylamine, $(C_3H_7)_2NH$;
(i) $Pr_3N$: tri-n-propylamine $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol.

Preparative Procedures

Preparative examples were carried out by forming a starting reaction mixture by adding the $H_3PO_4$ to one half of the quantity of water. This mixture was mixed and to this mixture the aluminum isopropoxide or CATAPAL was added. This mixture was then blended until a homogeneous mixture was observed. To this mixture the LUDOX LS was added and the resulting mixture blended (about 2 minutes) until a homogeneous mixture was observed. A second mixture was prepared using the manganese acetate and the remainder (about 50%) of the water. The two mixtures were admixed and the resulting mixture blended until a homogeneous mixture was observed. The organic templating agent was then added to the resulting mixture and the resulting mixture blended until a homogeneous mixture was observed, i.e., about 2 to 4 minutes. (The pH of the mixture was measured and adjusted for temperature). The mixture was then placed in a lined (polytetrafluoroethylene) stainless steel pressure vessel and digested at a temperature (150° C. or 200° C.) for a time or placed in lined screw top bottles for digestion at 100° C. All digestions were carried out at the autogenous pressure.

CoAPSO Molecular Sieves

The CoAPSO molecular sieves of U.S. Ser. No. 600,174, filed Apr. 13, 1984, now U.S. Pat. No. 4,744,970, have three-dimensional microporous framework structures of $CoO_2^{-2}$, $AlO_2^{-}$, $PO_2^{-}$and $SiO_2$ tetrahedral units and have an empirical chemical composition on an anhydrous basis expressed by the formula:

wherein "R" represents at least one organic templating agent present in the intracrystalline pore system; "m" represents the molar amount of "R" present per mole of $(Co_wAl_xP_ySi_z)O_2$ and has a value of from zero a 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the limiting compositional values or points as follows:

| | Mole Fraction | | |
|---|---|---|---|
| Point | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CoAPSO molecular sieves the values of "w", "x", "y", and "z" in the above formula are within the limiting compositional values or points as follows:

| | Mole Fraction | | |
|---|---|---|---|
| Point | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

CoAPSO compositions are generally synthesized by hydrothermal crystallization from a reaction mixture containing reactive sources of cobalt, silicon, aluminum and phosphorus, an organic templating, i.e., structure-directing, agent, preferably a compound of an element of Group VA of the Periodic Table, and optionally an alkali metal. The reaction mixture is generally placed in a sealed pressure vessel, preferably lined with an inert plastic material such as polytetrafluoroethylene and heated, preferably under autogenous pressure at an effective temperature which is generally between 50° C. and 250° C. and preferably between 100° C. and 200° C. until crystals of the CoAPSO product are obtained, usually for an effective time of from several hours to several weeks. Generally the effective crystallization time will be from about 2 hours to about 30 days and typically from about 4 hours to about 20 days. The product is recovered by any convenient method such as centrifugation or filtration.

In synthesizing the CoAPSO, it is preferred to employ a reaction mixture composition expressed in terms of the molar ratios as follows:

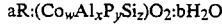

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; and "w", "x", "y" and "z" represent the mole fractions of cobalt, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

|       | Mole Fraction |      |         |
| ----- | ------------- | ---- | ------- |
| Point | x             | y    | (z + w) |
| F     | 0.60          | 0.38 | 0.02    |
| G     | 0.38          | 0.60 | 0.02    |
| H     | 0.01          | 0.60 | 0.39    |
| I     | 0.01          | 0.01 | 0.98    |
| J     | 0.60          | 0.01 | 0.39    |

For reasons unknown at present, not every reaction mixture gave crystalline CoAPSO products when reaction products were examined for CoAPSO products by X-ray analysis. Those reaction mixtures from which crystalline CoAPSO products were obtained are reported in the examples hereinafter as numbered examples and those reaction mixtures from which CoAPSO products were not identified by use of X ray analysis are reported as lettered examples.

In the foregoing expression of the reaction composition, the reactants are normalized with respect to the total of "w", "x", "y" and "z" such that $(w+x+y+z)=1.00$ mole. Molecular sieves containing cobalt, aluminum, phosphorus and silicon as framework tetrahedral oxide units are prepared as follows:

Preparative Reagents

CoAPSO compositions were prepared using numerous reagents. The reagents employed and abbreviations employed herein, if any, for such reagents are as follows:

(a) Alipro: aluminum isoproproxide;
(b) CATAPAL: Trademark of Condea Corporation for pseudoboehmite;
(c) LUDOX LS: Trademark of DuPont for an aqueous solution of 30 weight percent $SiO_2$ and 0.1 weight percent $Na_2O$;
(d) Co(Ac)$_2$: cobalt acetate $Co(C_2H_3O_2)_2.4H_2O$;
(e) $CoSO_4$: cobalt sulfate $(CoSO_4.7H_2O)$;
(f) $H_3PO_4$: 85 weight percent phosphoric acid in water;
(g) TBAOH: tetrabutylammonium hydroxide (25 wt. % in methanol);
(h) Pr$_2$NH: di-n-propylamine, $(C_3H_7)_2NH$;
(i) Pr$_3$N: tri-n-propylamine, $(C_3H_7)_3N$;
(j) Quin: Quinuclidine $(C_7H_{13}N)$;
(k) MQuin: Methyl Quinuclidine hydroxide, $(C_7H_{13}NCH_3OH)$;
(l) C-hex; cyclohexylamine;
(m) TEAOH; tetraethylammonium hydroxide (40 wt. % in water);
(n) DEEA: diethanolamine;
(o) TPAOH: tetrapropylammonium hydroxide (40 wt. % in water); and
(p) TMAOH: tetramethylammonium hydroxide (40 wt. % in water).

Preparative Procedure

The CoAPSO compositions were prepared by preparing reaction mixtures having a molar composition expressed as:

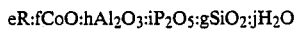

$eR:fCoO:hAl_2O_3:iP_2O_5:gSiO_2:jH_2O$ wherein e, f, h, i, g and j represent the moles of template R, cobalt (expressed as the oxide), $Al_2O_3$, $P_2O_5$ ($H_3PO_4$ expressed as $P_2O_5$), $SiO_2$ and $H_2O$, respectively.

The reaction mixtures were prepared by forming a starting reaction mixture comprising the $H_3PO_4$ and one half of the water. This mixture was stirred and the aluminum source (Alipro or CATAPAL) added. The resulting mixture was blended until a homogeneous mixture was observed. The LUDOX-LS was then added to the resulting mixture and the new mixture blended until a homogeneous mixture was observed. The cobalt source (Co(Ac)$_2$, CoSO$_4$) or mixtures thereof) was dissolved in the remaining water and combined with the first mixture. The combined mixture was blended until a homogeneous mixture was observed. The organic templating agent was added to this mixture and blended for about two to four minutes until a homogeneous mixture was observed. The resulting mixture (final reaction mixture) was placed in a lined (olytetra- fluoroethylene) stainless steel pressure vessel and digested at a temperature (150° C., 200° C. or 225° C.) for a time. Alternatively, if the digestion temperature was 100° C. the final reaction mixture was placed in a lined (polytetrafluoroethylene) screw top bottle for a time. All digestions were carried out at the autogenous pressure. The products were removed from the reaction vessel, cooled and evaluated.

ZnAPSO Molecular Sieves

The ZnAPSO molecular sieves of U.S. Ser. No. 600,170, filed Apr. 13, 1984, comprise framework structures of $ZnO_2^{-2}$, $AlO_2^-$, $PO_2^+$ and $SiO_2$ tetrahedral units having an empirical chemical composition on an anhydrous basis expressed by the formula:

$mR:(Zn_wAl_xP_ySi_z)O_2$ wherein "R" represents at least one organic templating agent present in the intracrystalline pore system; "m" represents the molar amount of "R" present per mole of $(Zn_wAl_xP_ySi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01. The mole fractions "w", "x", "y" and "z" are generally defined being within the limiting compositional values or points as follows:

|       | Mole Fraction |      |         |
| ----- | ------------- | ---- | ------- |
| Point | x             | y    | (z + w) |
| A     | 0.60          | 0.38 | 0.02    |
| B     | 0.38          | 0.60 | 0.02    |
| C     | 0.01          | 0.60 | 0.39    |
| D     | 0.01          | 0.01 | 0.98    |
| E     | 0.60          | 0.01 | 0.39    |

In a preferred subclass of ZnAPSO molecular sieves the values "w", "x", "y" and "z" in the above formula are within the limiting compositional values or points as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

ZnAPSO compositions are generally synthesized by hydrothermal crystallization at effective process conditions from a reaction mixture containing active sources of zinc, silicon, aluminum and phosphorus, preferably an organic templating, i.e., structure directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ZnAPSO product are obtained, usually a period of from several hours to several weeks. Generally the effective crystallization period is from about 2 hours to about 30 days with typical periods of from about 4 hours to about 20 days being employed to obtain ZnAPSO products. The product is recovered by any convenient method such as centrifugation or filtration.

In synthesizing the ZnAPSO compositions, it is preferred to employ a reaction mixture composition expressed in terms of the molar ratios as follows:

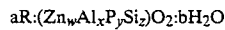

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, more preferably between about 2 and about 300; and "w", "x", "y" and "z" represent the mole fractions of zinc, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing zinc, aluminum, phosphorus and silicon as framework tetrahedral oxide units are prepared as follows:

Preparative Reagents

ZnAPSO compositions were prepared using numerous reagents. The reagents employed and abbreviations employed herein, if any, for such reagents are as follows:

(a) Alipro: aluminum isopropoxide;
(b) LUDOX-LS: LUDOX-LS is the trade name of DuPont for an aqueous solution of 30 weight percent $SiO_2$ and 0.1 weight percent $Na_2O$;
(c) CATAPAL: Trademark of Condea Corporation for hydrated pseudoboehmite;
(d) $H_3PO_4$: 85 weight percent aqueous phosphoric acid;
(e) ZnAc: Zinc Acetate, $Zn(C_2H_3O_2)_2.4H_2O$;
(f) TEAOH: 40 weight percent aqueous solution of tetraethylammonium hydroxide;
(g) TBAOH: 40 weight percent aqueous solution of tetrabutylammonium hydroxide;
(h) TMAOH: Tetramethylammonium hydroxide pentahydrate, $(CH_3)_4NOH.5H_2O$;
(i) TPAOH: 40 weight percent aqueous solution of tetrapropylammonium hydroxide, $(C_3H_7)_4NOH$;
(j) $Pr_2NH$: di-n-propylamine, $(C_3H_7)_2NH$;
$Pr_3N$: Tri-n propylamine, $(C_3H_7)_3N$;
(l) Quin: Quinuclidine, $(C_7H_{13}N)$;
(m) C-hex: cyclohexylamine; and
(n) DEEA: diethylethanolamine, $(C_2H_5)_2NC_2H_5OH$.

Preparative Procedure

The ZnAPSO compositions were prepared by preparing reaction mixtures having a molar composition expressed as:

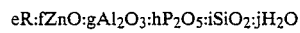

wherein e, f, g, h, i and j represent the moles of template R, zinc (expressed as the oxide), $Al_2O_3$, $P_2O_5$ ($H_3PO_4$ expressed as $P_2O_5$), $SiO_2$ and $H_2O$, respectively.

The reaction mixtures were prepared by forming a starting reaction mixture comprising the $H_3PO_4$ and a portion of the water. This mixture was stirred and the aluminum source added. The resulting mixture was blended until a homogeneous mixture was observed. The LUDOX LS was then added to the resulting mixture and the new mixture blended until a homogeneous mixture was observed. The zinc source (zinc acetate) was dissolved in the remaining water and combined with the first mixture. The combined mixture was blended until a homogenous mixture was observed. The organic templating agent was added to this mixture and blended for about two to four minutes until a homogenous mixture was observed. The resulting mixture (final reaction mixture) was placed in a lined (polytetrafluoroethylene) stainless steel pressure vessel and digested at an effective temperature for an effective time. All digestions were carried out at the autogenous pressure. The products were removed from the reaction vessel, cooled and evaluated.

FeAPSO Molecular Sieves

The FePSO of U.S. Ser. No. 600,173, filed Apr. 13, 1984 now U.S. Pat. No. 4,683,217 have molecular sieves having a three-dimensional microporous crystal framework structures of $FeO_2^{-2}$, (and/or $FeO_2^{-}$), $AlO_2^{-}$, $PO_2^{+}$ and $SiO_2$ tetrahedral oxide units and having a unit empirical formula, on an anhydrous basis, of:

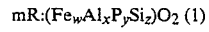

wherein "R" represents at least one organic templating agent present in the intracrystalline pore system; "m" represents the moles of "R" present per mole of (Fe$_w$Al$_x$P$_y$Si$_z$)O$_2$ and has a value of from zero (0) to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides, said mole fractions being such that they are within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

The values of w, x, y and z may be as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

The FeAPSOs of the instant invention are generally synthesized by hydrothermal crystallization from a reaction mixture comprising reactive sources of iron, aluminum, phosphorus and silicon, and preferably one or more organic templating agents. Optionally, alkali or other metal(s) may be present in the reaction mixture and may act as templating agents. The reaction mixture is generally placed in a pressure vessel, preferably lined with an inert plastic material, such as polytetrafluoroethylene, and heated, preferably under the autogenous pressure, at an effective temperature which is generally between about 50° C., and about 250° C. and preferably between about 100° C. and 200° C. until crystals of the FeAPSO product are obtained, usually a period of from several hours to several weeks. Molecular sieves containing iron, aluminum phosphorus and silicon as framework tetrahedral oxide units are prepared as follows:

Preparative Reagents

FeAPSO compositions were prepared using numerous reagents. The reagents employed and abbreviations employed herein, if any, for such reagents are as follows:
 (a) Alipro: aluminum isopropoxide, Al(OCH(CH$_3$)$_2$)$_3$;
 (b) LUDOX-LS: LUDOX-LS is the trademark of Du Pont for an aqueous solution of 30 weight percent SiO$_2$ and 0.1 weight percent Na$_2$O;
 (c) CATAPAL: trademark for hydrated aluminum oxide containing about 75 wt. % Al$_2$O$_3$ (pseudoboehmite phase) and about 25 wt. percent water.
 (c) Fe(Ac)$_2$: Iron (II) acetate;
 (d) FeSO$_4$: Iron (II) sulfate hexahydrate;
 (e) H$_3$PO$_4$: 85 weight percent phosphoric acid in water;
 (f) TEAOH: 40 weight percent aqueous solution of tetraethylammonium hydroxide;
 (g) TBAOH: 40 weight percent aqueous solution of tetrabutylammonium hydroxide;
 (h) Pr$_2$NH: di-n-propylamine ((C$_3$H$_7$)$_2$NH);
 (i) Pr$_3$N: tri-n-propylamine ((C$_3$H$_7$)$_3$N);
 (j) Quin: Quinuclidine (C$_7$H$_{13}$N);
 (k) MQuin: Methyl Quinuclidine hydroxide (C$_7$H$_{13}$NCH$_3$OH);
 (l) TMAOH: tetramethylammonium hydroxide pentahydrate; and
 (m) C-hex; cyclohexylamine.

(a) Examples were carried out to demonstrate the preparation of FeAPSO-34 and FeAPSO-5. The reaction mixtures were prepared by grinding the aluminum isopropoxide in a blender followed by slowly adding the H$_3$PO$_4$ solution with mixing. A solution/dispersion of iron acetate in water was added and then the LUDOX-LS was added. The organic templating agent was then added to this mixture, or in some cases one-half of this mixture, and the mixture blended to form a homogeneous mixture. The number of moles of each component in the reaction mixture was as follows:

| Component | Moles |
|---|---|
| Al$_2$O$_3$ | 0.9 |
| P$_2$O$_5$ | 0.9 |
| SiO$_2$ | 0.2** |
| FeO* | 0.2 |
| TEAOH | 1.0 |
| H$_2$O | 50 |

*Iron (II) acetate reported as Iron (II) oxide.
*SiO$_2$ was 0.6 in examples 5C to 8C Each reaction mixture was sealed in a stainless steel pressure vessel lined with polytetrafluoroethylene and heated in an oven at a temperature, time and at the autogenous pressure. The solid reaction product was recovered by filtration, washed with water and dried at room temperature.

(b) Examples were carried out to demonstrate the preparation of FeAPSO 11 and FeAPSO-5. The reaction mixtures were prepared by grinding the aluminum iso-propoxide in a blender followed by addition of a solution/dispersion of iron (II) acetate. H$_3$PO$_4$ was added to this mixture and the resulting mixture blended to form a homogeneous mixture. LUDOX-LS was added to this mixture except that in some examples the LUDOX-LS was added with the H$_3$PO$_4$. The resulting mixtures were blended until a homogeneous mixture was observed. Organic templating agent was added to each mixture and the resulting mixtures placed in a stainless steel pressure vessel lined with polytetrafluoroethylene and heated, washed and the product recovered as in part (a) of this example. The products were analyzed. The number of moles of each component in the reaction mixture was as follows:

| Component | Moles |
|---|---|
| Al$_2$O$_3$ | 0.9 |
| P$_2$O$_5$ | 0.9 |
| SiO$_2$ | 0.2 |
| FeO* | 0.2 |
| Template | 1.0 |
| H$_2$O | 50 |

*Iron (II) acetate reported as Iron (II) oxide.

CoMnAPSO Molecular Sieves

The expressed by the empirical chemical formula (anhydrous):

where "u", "v", "x", "y" and "z" represent the mole. The CoMnAPSO molecular sieves have an empirical chemical composition on an anhydrous basis expressed by the formula:

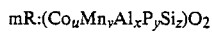

wherein "R" represents at least one organic templating agent present in the intracrystalline pore system; "m" represents the molar amount of "R" present per mole of $(Co_uMn_vAl_xP_ySi_z)O_2$ from zero (0) to about 0.3; and "u", "v", "x", "y" and "z" represent the mole fractions of cobalt, manganese, aluminum, phosphorus and silicon, respectively, present as tetrahedral oxides. The mole fractions "u", "v", "x", "y", and "z" are generally defined as being within the limiting compositional values or points as follows, wherein "w", the combined mole fractions of manganese and cobalt, is the sum of "u" and "v":

|       | Mole Fraction |      |         |
|-------|------|------|---------|
| Point | x    | y    | (z + w) |
| A     | 0.60 | 0.37 | 0.03    |
| B     | 0.37 | 0.60 | 0.03    |
| C     | 0.01 | 0.60 | 0.39    |
| D     | 0.01 | 0.01 | 0.98    |
| E     | 0.60 | 0.01 | 0.39    |

Figure 2:
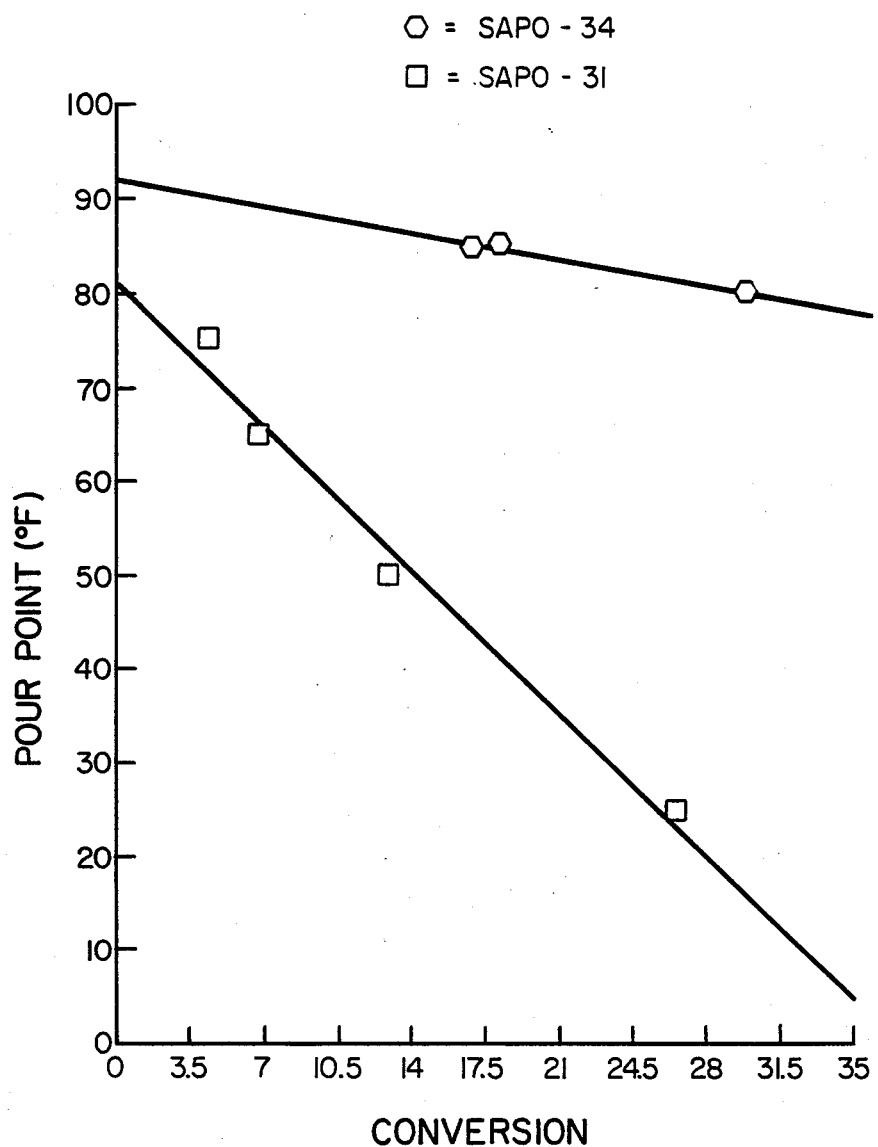
FIG. 2 is a plot of the pour point (°F.) as a function of conversion of Catalyst B (SAPO-31) and comparative Catalyst C (SAPO-34).

The mole fractions u, v, x, y and z, expressed as in FIG. 1, are preferably defined as being within the tetragonal compositional area defined by points a, b, c and d of FIG. 2 as follows:

|   | Mole Fraction |      |         |
|---|------|------|---------|
|   | x    | y    | (z + w) |
| a | 0.55 | 0.42 | 0.03    |
| b | 0.42 | 0.55 | 0.03    |
| c | 0.10 | 0.55 | 0.35    |
| d | 0.55 | 0.10 | 0.35    |

CoMnAPSO compositions are generally synthesized by hydrothermal crystallization from a reaction mixture containing reactive sources of cobalt, manganese, aluminum, phosphorus and silicon and preferably an organic templating agent, i.e., structure-directing, agent. The structure-directing agents are preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogenous pressure and at typical effective temperatures between 50° C. and 250° C., preferably between 100° C. and 200° C., until crystals of the CoMnAPSO product are obtained, usually over a period of from several hours to several weeks. Typical effective crystallization times are from about 2 hours to 30 days with from about 4 hours to about 20 days being generally employed to obtain CoMnAPSO products. The product is recovered by any convenient method such as centrifugation or filtration.

In synthesizing the CoMnAPSO compositions, it is preferred to employ a reaction mixture composition expressed in terms of the molar ratios as follows:

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "u", "v", "x", "y", and "z" represent the mole fractions of elements cobalt, manganese, aluminum, phosphorus and silicon, respectively, and each has a value of at least 0.01.

In a preferred embodiment the reaction mixture is selected such that the mole fractions "w", "x", "y" and "z" are generally defined as being within the limiting compositional values or points as follows:

|   | Mole Fraction |      |         |
|---|------|------|---------|
|   | x    | y    | (z + w) |
| F | 0.60 | 0.37 | 0.03    |
| G | 0.37 | 0.60 | 0.03    |
| H | 0.01 | 0.60 | 0.39    |
| I | 0.01 | 0.01 | 0.98    |
| J | 0.60 | 0.01 | 0.39    |

In the foregoing expression of the reaction composition, the reactants are normalized with respect to the total of "u", "v", "x", "y" and "z" such that $(u+v+x+y+z)=1.00$ mole. CoMnAPSO compositions were prepared using numerous regents. The reagents employed and abbreviations employed herein, if any, for such reagents are as follows:

(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent phosphoric acid;
(d) MnAc: Manganese acetate, $Mn(C_2H_3O_2)_2.4H_2O$;
(e) CoAc: Cobalt Acetate, $Co(C_2H_3O_2)_2.4H_2O$;
(f) TEAOH: 40 weight percent aqueous solution of tetraethylammonium hydroxide; and
(g) $Pr_2NH$: di-n-propylamine, $(C_3H_7)_2NH$.

Preparative Procedures

Preparative examples were carried out by forming a starting reaction mixture by adding the $H_3PO_4$ and one half of the quantity of water. To this mixture the aluminum isopropoxide was added. This mixture was then blended until a homogeneous mixture was observed. To this mixture the LUDOX-LS was added and the resulting mixture blended (about 2 minutes) until a homogeneous mixture was observed. A second mixture was prepared using manganese acetate and one half of the remaining water. A third mixture was prepared using cobalt acetate and one half of the remaining water. The three mixtures were admixed and the resulting mixture blended until a homogeneous mixture was observed. The organic templating agent was then added to the resulting mixture and the resulting mixture blended until a homogeneous mixture was observed, i.e., about 2 to 4 minutes. The pH of the mixture was measured and adjusted for temperature. The mixture was then placed in a lined (polytetrafluoroethylene) stainless steel pressure vessel and digested at a temperature. All digestions were carried out at the autogenous pressure.

CoMnMgAPSO Molecular Sieves

The CoMnMgAPSO molecular sieves of U.S. Ser. No. 600,182, filed Apr. 13, 1984, now abandoned, have three-dimensional microporous framework structures of $CoO_2^{-2}$, $MnO_2^{-2}$, $MgO_2^{-2}$, $AlO_2^-$, $PO_2^+$ and $SiO_2$ tetrahedral oxide units and have an empirical chemical composition on an anhydrous basis expressed by the formula:

$$mR:(Co_tMn_uMg_vAl_xP_ySi_z)O_2$$

wherein "R" represents at least one organic templating agent present in the intracrystalline pore system; "m" represents the molar amount of "R" present per mole of $(Co_tMn_uMg_vAl_xP_ySi_z)O_2$, and has a value of from zero to about 0.3; and "t", "u", "v", "x", "y" and "z" represent the mole fractions of cobalt, manganese, magnesium, aluminum, phosphorus and silicon, respectively, present as tetrahedral oxides, each having a value of at least 0.01. The mole fractions "t", "u", "v", "x", "y" and "z" are generally defined as being within the limiting compositional values or points as follows, wherein "w", the combined mole fractions of cobalt, manganese and magnesium, is the sum of "t", "u" and "v":

| Point | Mole Fraction | | |
|---|---|---|---|
| | x | y | (z + w) |
| A | 0.60 | 0.36 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the CoMnMgAPSO molecular sieves the values of "w", "x", "y" and "z" in the above formula are within the limiting compositional values or points as follows:

| Point | Mole Fraction | | |
|---|---|---|---|
| | x | y | (z + w) |
| a | 0.55 | 0.41 | 0.04 |
| b | 0.41 | 0.55 | 0.04 |
| c | 0.10 | 0.55 | 0.35 |
| d | 0.55 | 0.10 | 0.35 |

The CoMnMgAPSOs of this invention are useful as adsorbents, catalysts, ion-exchangers, and the like in much the same fashion as aluminosilicates have been employed heretofore, although their chemical and physical properties are not necessarily similar to those observed for aluminosilicates.

CoMnMgAPSO compositions are generally synthesized by hydrothermal crystallization from a reaction mixture containing reactive sources of cobalt, manganese, magnesium, aluminum, phosphorus and silicon, and preferably an organic templating agent, i.e., structure-directing, agent. The structure-directing agents are preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the CoMnMgAPSO product are obtained, usually over a period of from several hours to several weeks. Typical crystallization times are from about 2 hours to about 30 days with from about 4 hours to about 20 days generally being employed to obtain CoMnMgAPSO products. The product is recovered by any convenient method such as centrifugation or filtration.

In synthesizing the CoMnMgAPSO compositions, it is preferred to employ a reaction mixture composition expressed in terms of the molar ratios as follows:

$$aR:(Co_tMn_uMg_vAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "t", "u", "v", "x", "y", and "z" represent the mole fractions of cobalt, manganese, magnesium, aluminum, phosphorus and silicon, respectively, and each has a value of at least 0.01.

In a preferred embodiment the reaction mixture is selected such that the mole fractions "w", "x", "y" and "z", where "w" is the sum of "t"+"u"+"v", are generally defined as being within the limiting compositional values or points as follows:

| Point | Mole Fraction | | |
|---|---|---|---|
| | x | y | (z + w) |
| F | 0.60 | 0.36 | 0.04 |
| G | 0.36 | 0.60 | 0.04 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "t", "u", "v", "x", "y" and "z" such that $(t+u+v+x+y+z)=1.00$ mole. Molecular sieves containing cobalt, manganese, magnesium, aluminum, phosphorus and silicon as framework tetrahedral oxide units are prepared as follows:

Preparative Reagents

CoMnMgAPSO compositions were prepared using numerous reagents. The reagents employed and abbreviations employed herein, if any, for such reagents are as follows:

(a) Alipro: aluminum isopropoxide;
(b) LUDOX-LS: LUDOX-LS is the tradename of Du Pont for an aqueous solution of 30 weight percent $SiO_2$ and 0.1 weight percent $Na_2O$;
(c) $H_3PO_4$: aqueous solution which is 85 weight percent phosphoric acid;
(d) MnAc: Manganese acetate, $Mn(C_2H_3O_2)_2.4H_2O$;
(e) CoAc: Cobalt Acetate, $Co(C_2H_3O_2)_2.4H_2O$;
(f) MgAc: Magnesium Acetate $Mg(C_2H_3O_2).4H_2O$;
(g) TEAOH: 40 weight percent aqueous solution of tetraethylammonium hydroxide; and
(h) $Pr_2NH$: di-n-propylamine, $(C_3H_7)_2NH$.

Preparative Procedures

Preparative examples were carried out by forming a starting reaction mixture by adding the H₃PO₄ and one half of the quantity of water. To this mixture the aluminum isoproxide was added. This mixture was then blended until a homogeneous mixture was observed. To this mixture the LUDOX-LS was added and the resulting mixture blended (about 2 minutes) until a homogeneous mixture was observed.

Three additional mixtures were prepared using cobalt acetate, magnesium acetate and manganese acetate using one third of the remainder of the water for each mixture. The four mixtures were then admixed and the resulting mixture blended until a homogeneous mixture was observed. The organic templating agent was then added to the resulting mixture and the resulting mixture blended until a homogeneous mixture was observed, i.e., about 2 to 4 minutes. The mixture was then placed in a lined (polytetrafluoroethylene) stainless steel pressure vessel and digested at a temperature for a time. All digestions were carried out at the autogenous pressure.

SAPO Molecular Sieves

The silicoaluminophosphate molecular sieves of U.S. Pat. No. 4,440,871 are microporous crystalline silicoaluminophosphates the pores of which are uniform and have nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" represents the moles of "R" present per mole of $(Si_xAl_yP_z)O_2$; "m" has a value of from 0.02 to 0.3, "x", "y" and "z" represent the mole fractions of silicon, aluminum and phosphorus respectively, present as tetrahedral oxides, said mole fractions being such that they are within the pentagonal compositional area defined by points ABCD and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^-$, $AlO_2^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which is FIG. 1, said silicoaluminophosphate having a characteristic X-ray powder diffraction pattern which contains at least the d-spacings set forth below in any one of Tables I, III, V, VII, IX, XII, XVII, XXI, XXIII or XXV of U.S. Pat. No. 4,440,871. Further, such crystalline silicoaluminophosphates may be calcined at a temperature sufficiently high to remove at least some of any organic templating agent present in the intracrystalline pore system. The silicoaluminophosphates of U.S. Pat. No. 4,440,871 are generally referred to therein as "SAPO-n", as a class, or as "SAPO-n" wherein "n" is an interger denoting a particular SAPO as its preparation is reported in U.S. Pat. No. 4,440,871. There has now been discovered a novel class of framework-substituted crystalline microporous aluminophosphates in which the substituent metal is one of a mixture of two or more divalent metals of the group magnesium, manganese, zinc and cobalt, and which exhibit adsorption, ion-exchange and/or catalytic properties similar to the prior known aluminosilicate, aluminophosphate and silicoaluminophosphate molecular sieve compositions. Members of this novel class of compositions have a three-dimensional microporous crystal framework structure of $MO_2^{-2}$, $AlO_2^-$ and $PO_2^+$ tetrahedral units and have an essential empirical chemical composition, on an anhydrous basis, of:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3 maximum value in each case depending upon the molecular dimensions of the templating agent and the available void volume of the pore system of the particular metal aluminophosphate involved; "x", "y", and "z" represent the mole fractions of the metal "M", (i.e., magnesium, manganese, zinc and cobalt), aluminum and phosphorus, respectively, present as tetrahedral oxides, said mole fractions being such that they are representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized in accordance with the novel process of the present invention, the minimum value of "m" in the formula above is 0.02. In a preferred subclass of the metal aluminophosphates of this invention, the values of "x", "y" and "z" in the formula above are representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The metal aluminophosphates of this new class of compositions exhibit molecular sieving properties, and, in common with zeolitic aluminosilicates, are capable of reversibly adsorbing water and other molecular species. Many are capable of reversibly undergoing complete dehydration without loss or change in crystal structure. All of the as-synthesized compositions of this invention are capable of withstanding 350° C. calcination in air for extended periods, i.e., at least 2 hours, without becoming amorphous. While it is believed that the M, Al and P framework constituents are present in tetrahedral coordination with oxygen, it is theoretically possible that some minor fraction of these framework constituents are present in coordination with five or six oxygen atoms. It is not, moreover, necessarily the case that all of the M, Al and/or P content of any given synthesized product be a part of the framework in the aforesaid types of coordination with oxygen. Some of each constituent may be merely occluded or in some as yet undetermined form and may or may not be structurally significant.

Since the term "metal aluminophosphate" is somewhat cumbersome, particularly in view of the need for numerous repetitions thereof in describing the compositions of the present invention in this specification, the "short-hand" reference "MeAPO" is sometimes employed hereinafter. Also in those cases where the metal "Me" in the composition is magnesium, the acronym MAPO is applied to the composition. Similarly, ZAPO, MnAPO, and CoAPO are applied to the compositions which contain zinc, manganese and cobalt, respectively. To identify the various structural species which make up each of the subgeneric classes MAPO, ZAPO, CoAPO and MnAPO, each species is assigned a number and is identified, for example, as ZAPO-5, MAPO-11, CoAPO-34 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $AlO_2^-$ and/or $MO_2^{-2}$ tetrahedra not associated with $PO_2^{30}$ tetrahedra or an organic ion derived from the organic templating agent.

The aforesaid novel metal aluminophosphates are synthesized by hydrothermal crystallization from a reaction mixture containing reactive sources of the metal "M", alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature between 100° C. and 225° C., and preferably between 100° C. and 200° C. until crystals of the metal aluminophosphate product are obtained, usually a period of from 4 hours to 2 weeks. The product is recovered by any convenient method such as centrifugation or filtration.

In synthesizing the MeAPO compositions of the present invention, it is preferred to employ a reaction mixture composition expressed in terms of molar ratios as follows:

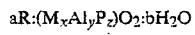

$aR:(M_xAl_yP_z)O_2:bH_2O$ wherein "R" is an organic templating agent; "a" has a value great enough to constitute an effective concentration of "R" and is within the range of >0 to 6; "b" has a value of from zero to 500, preferably 2 to 30; "M" represents a metal of the group zinc, magnesium, manganese and cobalt, "x", "y" and "z" represent the mole fractions, respectively, of "M", aluminum and phosphorus in the $(M_xAl_yP_z)O_2$ constituent, and each has a value of at least 0.01, the said points E, F, G, H, I, and J representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(M+Al+P)=(x+y+z)=1.00$ mole.

In forming the reaction mixture from which the present metal aluminophosphates are crystallized the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tripropylamine; triethylamine; triethanolamine; piperidine; cyclohexylamine 2-methylpyridine; N,N-dimethylbenzylamine; N-N-dimethylethanolamine; choline; N,N'-dimethylpiperazine; 1,4-diazabicyclo (2,2,2) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of metal aluminophosphate (MeAPO), i.e., a single templating agent can, with proper manipulation of the reaction conditions, direct the formation of several MeAPO compositions, and a given MeAPO composition can be produced using several different templating agents.

The most suitable phosphorus source yet found for the present process is phosphoric acid, but organic phosphates such as triethylphosphate have been found satisfactory, and so also have crystalline or amorphous aluminophosphates such as the $AlPO_4$ composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The preferred aluminum source is either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The metals zinc, cobalt, magnesium and manganese can be introduced into the reaction system in any form which permits the formation in situ of reactive divalent ions of the respective metals. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, and the like.

While not essential to the synthesis of MeAPO compositions, it has been found that in general, stirring or other moderate agitation of the reaction mixture and/or seeding the reaction mixture with seed crystals of either the MeAPO species to be produced or a topologically similar aluminophosphate or aluminosilicate composition, facilitates the crystallization procedure.

After crystallization the MeAPO product is isolated and advantageously washed with water and dried in air. The as-synthesized MeAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular MeAPO species. As a general rule, the templating agent, and hence the occluded organic species, is too large to move freely through the pore system of the MeAPO product and must be removed by calcining the MeAPO at temperatures of 200° C. to 700° C. to thermally degrade the organic species. In a few instances the pores of the MeAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the MeAPO phase wherein the organic moiety occupying the intracrystalline pore system as a result of the hydrothermal crystallization process has been reduced by post-synthesis treatment such that the value of "m" in the composition formula

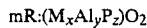
$mR:(M_xAl_yP_z)O_2$ has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized MeAPO material.

Since the present MeAPO compositions are formed from $AlO_2$, $PO_2$, and $MO_2$ tetrahedral units which, respectively, have a net charge of $-1$, $+1$, and $-2$, the matter of cation exchangeability is considerably more complicated than in the case of zeolitic molecular sieves in which, ideally, there is a stoichiometric relationship between $AlO_2$ tetrahedra and charge-balancing cations. In the MeAPO compositions, an $AlO_2^-$ tetrahedron can be balanced electrically either by association with a $PO_2^+$ tetrahedron or a simple cation such as an alkali metal cation, a cation of the metal "M" present in the reaction mixture, or an organic cation derived from the templating agent. Similarly an $MO_2^{-2}$ tetrahedron can be balanced electrically by association with $PO_2^+$ tetrahedra, a cation of the metal "M", organic cations derived from the templating agent, or other divalent or polyvalent metal cations introduced from an extraneous source. It has also been postulated that non adjacent $AlO_2^-$ and $PO_2^+$ tetrahedral pairs can be balanced by $Na^+$ and $OH^-$, respectively [Flanigen and Grose, Molecular Sieve Zeolites-I, ACS, Washington, D.C. (1971)].

In any event, all of the MeAPO compositions of the present invention examined to date have exhibited cation-exchange capacity, in some cases to a significant degree, when analyzed using ion-exchange techniques heretofore employed with zeolitic aluminosilicates. All have uniform pore diameters which are inherent in the lattice structure of each species and which are at least about 3Å in diameter. Ion exchange is ordinarily possible only after the organic moiety present as a result of synthesis has been removed from the pore system. Dehydration to remove water present in the as-synthesized MeAPO compositions can usually be accomplished, to some degree at least, in the usual manner without removal of the organic moiety, but the absence of the organic species greatly facilitates adsorption and desorption procedures. As illustrated hereinafter, the MeAPO materials have various degrees of hydrothermal and thermal stability, some being quite remarkable in this regard, and function well as molecular sieve adsorbents and hydrocarbon conversion catalyst or catalyst bases.

There has now been discovered a novel class of framework-substituted crystalline microporous aluminophosphates in which the substituent metal is iron, and which exhibit adsorption, ion-exchange and/or catalytic properties similar to the prior known aluminosilicate, aluminophosphate and silicoaluminophosphate molecular sieve compositions. Members of this novel class of ferroaluminophosphates have a three-dimensional microporous crystal framework structure of $AlO_2$, $FeO_2$, and $PO_2$ tetrahedral units and have an essential empirical chemical composition, on an anhydrous basis, of:

$mR:(Fe_xAl_yP_z)O_2$ wherein "R" represents at least one organic templating agent present in the intracrystalline pore system; "m" represents the moles of "R" present per mole of $(Fe_xAl_yP_z)O_2$ and has a value of from zero to 0.3, maximum value in each case depending upon the molecular dimensions of the templating agent and the available void volume of the pore system of the particular ferroaluminophosphate involved; "x", "y", and "z" represent the mole fractions of iron, aluminum and phosphorus, respectively, present as tetrahedral oxides, representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized in accordance with the novel process of the present invention, the minimum value of "m" in the formula above is 0.02. In a preferred subclass of the ferroaluminophosphates of this invention, the values of "x", "y" and "z" in the formula above are representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The iron of the $FeO_2$ structural units of the present compositions can be in either the ferric or ferrous valence state, depending largely upon the source of the iron in the synthesis gel. Thus, an $FeO_2$ tetrahedron in the structure can have a net charge of either $-1$ or $-2$. While it is believed that the Fe, Al and P framework constituents are present in tetrahedral coordination with oxygen (and are referred to herein as such), it is theoretically possible that some minor fraction of these framework constituents are present in coordination with five or six oxygen atoms. It is not, moreover, necessarily the case that all of the Fe, Al and/or P content of any given synthesized product is a part of the framework in the aforesaid types of coordination with oxygen. Some of each constituent may be merely occluded or in some as yet undetermined form, and may or may not be structurally significant.

The ferroaluminophosphates of this new class of compositions exhibit molecular sieving properties, and, in common with zeolitic aluminosilicates, are capable of reversibly adsorbing water and other molecular species. Many are capable of reversibly undergoing complete dehydration without loss or change in crystal structure.

For convenience in describing the compositions of the present invention in this specification, the "shorthand" acronym "FAPO" is sometimes employed hereinafter. To identify the various structural species which make up the generic class FAPO, each species is assigned a number and is identified, for example, as FAPO-5, FAPO 11, FAPO-34 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $FeO_2^-$ and/or $AlO_2^{-2}$ tetrahedra, $FeO_2^{-2}$ tetrahedra associated with $PO_2^+$ tetrahedra or not associated with $PO_2^+$ tetrahedra or an organic ion derived from the organic templating agent.

The aforesaid novel ferroaluminophosphates are synthesized by hydrothermal crystallization from a reaction mixture containing reactive sources of iron oxide, alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature of at least 100° C., and preferably between 100° C. and 250° C. until crystals of the metal aluminophosphate product are obtained, usually a period of from 2 hours to 2 weeks. The product is recovered by any convenient method such as centrifugation or filtration.

In synthesizing the FAPO compositions of the present invention, it is preferred to employ a reaction mixture composition expressed in terms of molar ratios as follows:

$$aR:(Fe_xAl_yP_z)O_2:bH_2O$$

wherein "R" is an organic templating agent; "a" has a value great enough to constitute an effective concentration of "R" and is within the range of $>0$ to 6; "b" has a value of from zero to 500, preferably 2 to 80; "x", "y" and "z" represent the mole fractions, respectively, of iron, aluminum and phosphorus in the $(Fe_xAl_yP_z)O_2$ constituent, and each has a value o at least 0.01, and representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(Fe+Al+P)=(x+y+z)=1.00$ mole.

In forming the reaction mixture from which the present ferroaluminophosphates are crystallized, the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tri-n-propylamine; triethylamine; triethanolamine; piperidine; cyclohexylamine; 2-methylpyridine; N,N-dimethylbenzylamine; N-N-dimethylethanolamine; choline; N,N'-dimethylpiperazine; 1,4-diazabicyclo (2,2,2) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of ferroaluminophosphate (FAPO), i.e., a single templating agent can, with proper manipulation of the reaction conditions, direct the formation of several FAPO compositions, and a given FAPO composition can be produced using several different templating agents.

The most suitable phosphorus source yet found for the present process is phosphoric acid, but organic phosphates such as triethylphosphate have been found satisfactory, and so also have crystalline or amorphous aluminophosphates such as the $AlPO_4$ composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The preferred aluminum source is either an aluminum alkoxide, such as aluminum isoproproxide, or pseudo-boehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

Iron can be introduced into the reaction system in any form which permits the formation in situ of reactive ferrous or ferric ions. Advantageously iron salts, oxides or hydroxides are employed such as iron sulfate, iron acetate, iron nitrate, or the like. Other sources such as a freshly precipitated iron oxide $\gamma$-FeOOH, are also suitable.

While not essential to the synthesis of FAPO compositions, it has been found that in general, stirring or other moderate agitation of the reaction mixture and/or seeding the reaction mixture with seed crystals of either the FAPO species to be produced or a topologically similar aluminophosphate or aluminosilicate composition, facilitates the crystallization procedure.

After crystallization the FAPO product is isolated and advantageously washed with water and dried in air.

The as-synthesized FAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular FAPO species. As a general rule, the templating agent, and hence the occluded organic species, is too large to move freely through the pore system of the FAPO product and must be removed by calcining the FAPO at temperatures of 200° C. to 700° C. to thermally degrade the organic species. In a few instances the pores of the FAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the FAPO phase wherein the organic moiety occupying the intracrystalline pore system as a result of the hydrothermal crystallization process has been reduced by post-synthesis treatment such that the value of "m" in the composition formula

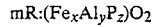

$mR:(Fe_xAl_yP_z)O_2$ has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized FAPO material.

Since the present FAPO compositions are formed from $AlO_2^-$, $PO_2^+$, $FeO_2^-$ and/or $FeO_2^{-2}$ units the matter of cation exchangeability is considerably more complicated than in the case of zeolitic molecular sieves in which, ideally, there is a stoichiometric relationship between $AlO_2$ tetrahedra and charge-balancing cations. In the FAPO compositions, an $AlO_2^-$ tetrahedron can be balanced electrically either by association with a $PO_2^+$ tetrahedron or a simple cation such as an alkali metal cation, a or $Fe^{+2}$ or $Fe^{+3}$ cation present in the reaction mixture, or an organic cation derived from the templating agent. Similarly an $FeO_2^-$ or $FeO_2^{-2}$ tetrahedron can be balanced electrically by association with $PO_2^+$ tetrahedron, a $Fe^{+2}$ or $Fe^{+3}$ cation, organic cations derived from the templating agent, or other metal cation introduced from an extraneous source. It has also been postulated that non-adjacent $AlO_2^-$ and $PO_2^+$ tetrahedral pairs can be balanced by $Na^+$ and $OH^-$, respectively [Flanigen and Grose, Molecular Sieve Zeolites-I, ACS, Washington, D.C. (1971)].

In any event, all of the FAPO compositions of the present invention examined to date have exhibited cation-exchange capacity, in some cases to a significant degree, when analyzed using ion-exchange techniques heretofore employed with zeolitic aluminosilicates. All have uniform pore diameters which are inherent in the lattice structure of each species and which are at least about 3Å in diameter. Ion exchange is ordinarily possible only after the organic moiety present as a result of synthesis has been removed from the pore system. Dehydration to remove water present in the as-synthesized FAPO compositions can usually be accomplished, to some degree at least, in the usual manner without removal of the organic moiety, but the absence of the organic species greatly facilitates adsorption and desorption procedures. As illustrated hereinafter, the FAPO materials have various degrees of hydrothermal and thermal stability, some being quite remarkable in this regard, and function well as molecular sieve adsorbents and hydrocarbon conversion catalyst or catalyst bases.

The present invention relates to titanium-containing molecular sieves comprising a three-dimensional microporous crystal framework structure of [TiO$_2$], [AlO$_2$] and [PO$_2$] tetrahedral units which has a unit empirical formula on an anhydrous basis of:

$$mR:(Ti_xAl_yP_z)O_2 \quad (1)$$

wherein "R" represents at least one organic templating agent present in the intracrystalline pore system; "m" represents the moles of "R" present per mole of $(Ti_xAl_yP_z)O_2$ and has a value of between zero and about 5.0, the maximum value in each case depending upon the molecular dimensions of the templating agent and the available void volume of pore system of the particular titanium molecular sieve; "x", "y" and "z" represent the mole fractions of titanium, aluminum and phosphorus, respectively, present as tetrahedral oxides, representing the following values for "x", "y" and "z":

| Point | Mole Fraction | | |
|---|---|---|---|
| | x | y | z |
| A | 0.001 | 0.45 | 0.549 |
| B | 0.88 | 0.01 | 0.11 |
| C | 0.98 | 0.01 | 0.01 |
| D | 0.29 | 0.70 | 0.01 |
| E | 0.001 | 0.70 | 0.299 |

The parameters "x", "y" and "z" are preferably within the following values for "x", "y" and "z":

| Point | Mole Fraction | | |
|---|---|---|---|
| | x | y | z |
| a | 0.002 | 0.499 | 0.499 |
| b | 0.20 | 0.40 | 0.40 |
| c | 0.20 | 0.50 | 0.30 |
| d | 0.10 | 0.60 | 0.30 |
| e | 0.002 | 0.60 | 0.398 |

The molecular sieves of the present invention are generally employable as catalysts for various hydrocarbon conversion processes.

The molecular sieves employed in the instant process will be referred to hereinafter, solely for point of reference herein as "TAPO" molecular sieves, or as "TAPOs" if the reference is to the class as a whole. This designation is simply made for the sake of convenient reference herein and is not meant to designate a particular structure for any given TAPO molecular sieve. The members of the class of TAPO's employed hereinafter in the examples will be characterized simply by referring to such members as TAPO-5, TAPO-11, etc, i.e., a particular species will be referred to as TAPO-n where "n" is a number specific to a given class member as its preparation is reported herein. This designation is an arbitrary one and is not intended to denote structural relationship to another material(s) which may also be characterized by a numbering system.

The term "unit empirical formula" is used herein according to its common meaning to designate the simplest formula which gives the relative number of moles of titanium, aluminum and phosphorus which form the [TiO$_2$], [PO$_2$] and [AlO$_2$] tetrahedral unit within a titanium-containing molecular sieve and which forms the molecular framework of the TAPO composition(s). The unit empirical formula is given in terms of titanium, aluminum and phosphorus as shown in Formula (1), above, and does not include other compounds, cations or anions which may be present as a result of the preparation or the existence of other impurities or materials in the bulk composition not containing the aforementioned tetrahedral unit. The amount of template R is reported as part of the composition when the as-synthesized unit empirical formula is given, and water may also be reported unless such is defined as the anhydrous form. For convenience, coefficient "m" for template "R" is reported as a value that is normalized by dividing the number of moles of organic by the total moles of titanium, aluminum and phosphorus.

The unit empirical formula for a TAPO may be given on an "as-synthesized" basis or may be given after an "as-synthesized" TAPO composition has been subjected to some post treatment process, e.g., calcination. The term "as-synthesized" herein shall be used to refer to the TAPO composition(s) formed as a result of the hydrothermal crystallization but before the TAPO composition has been subjected to post treatment to remove any volatile components present therein. The actual value of "m" for a post-treated TAPO will depend on several factors (including: the particular TAPO, template, severity of the post-treatment in terms of its ability to remove the template from the TAPO, the proposed application of the TAPO composition, and etc.) and the value for "m" can be within the range of values as defined for the as-synthesized TAPO compositions although such is generally less than the as-synthesized TAPO unless such post-treatment process adds template to the TAPO so treated. A TAPO composition which is in the calcined or other post-treatment form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The molecular sieves of the present invention are generally further characterized by an intracrystalline adsorption capacity for water at 4.6 torr and about 24° C. of about 3.0 weight percent. The adsorption of water has been observed to be completely reversible while retaining the same essential framework topology in both the hydrated and dehydrated state. The term "essential framework topology" is meant to designate the spatial arrangement of the primary bond linkages. A lack of change in the framework topology indicates that there is no disruption of these primary bond linkages.

The molecular sieves of the instant invention are generally synthesized by hydrothermal crystallization from a reaction mixture comprising reactive sources of titanium, aluminum and phosphorus, and one or more organic templating agents. Optionally, alkali metal(s) may be present in the reaction mixture. The reaction mixture is placed in a pressure vessel, preferably lined with an inert plastic material, such as polytetrafluoroethylene, and heated, preferably under the autogenous pressure, at a temperature of at least about 100° C., and preferably between 100° C. and 250° C., until crystals of the molecular sieve product are obtained, usually for a period of from 2 hours to 2 weeks. While not essential to the synthesis of the instant molecular sieves, it has been found that in general stirring or other moderate agitation of the reaction mixture and/or seeding the reaction mixture with seed crystals of either the TAPO to be produced, or a topologically similar composition, facilitates the crystallization procedure. The product is recovered by any convenient method such as centrifugation or filtration.

After crystallization the TAPO may be isolated and washed with water and dried in air. As a result of the hydrothermal crystallization, the as-synthesized TAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed TAPO and may be removed by a post-treatment process, such as by calcining the TAPO at temperatures of between about 200° C. and to about 700° C. so as to thermally degrade the template or by employing some other post-treatment process for removal of at least part of the template from the TAPO. In some instances the pores of the TAPO are sufficiently large to permit transport of the template, and, accordingly, complete or partial removal thereof can be accomplished by conventional desorption procedures such as carried out in the case of zeolites.

The TAPOs are preferably formed from a reaction mixture having a mole fraction of alkali metal cation which is sufficiently low that it does not interfere with the formation of the TAPO composition. The TAPO compositions are generally formed from a reaction mixture containing reactive sources of $TiO_2$, $Al_2O_3$, and $P_2O_5$ and an organic templating agent, said reaction mixture comprising a composition expressed in terms of molar oxide ratios of:

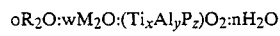

wherein "R" is an organic templating agent; "f" has a value large enough to constitute an effective amount of 'R' said effective amount being that amount which form said TAPO compositions; "g" has a value of from zero to 500; "x", "y" and "z" represent the mole fractions, respectively, of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

Although the TAPO compositions will form if higher concentrations of alkali metal cation are present, such reaction mixtures are not generally preferred. A reaction mixture, expressed in terms of molar oxide ratios, comprising the following bulk composition is preferred:

$$oR_2O:wM_2O:(Ti_xAl_yP_z)O_2:nH_2O$$

wherein "R" is an organic template; "o" has a value great enough to constitute an effective concentration of "R" and is preferably within the range of from greater than zero (0) to about 5.0; "M" is an alkali metal cation; "w" has a value of from zero to 2.5; "n" has a value between about zero (0) and about 500; "x", "y" and "z" represent the mole fractions, respectively, of titanium, aluminum and phosphorus in $(Ti_xAl_yP_z)O_2$ "x", "y" and "z" represent the mole fractions respectively of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

When the TAPOs are synthesized by this method the value of "m" in Formula (1) is generally above about 0.02.

Though the presence of alkali metal cations is not preferred, when they are present in the reaction mixture it is preferred to first admix at least a portion (e.g., at least about 10 weight percent) of each of the aluminum and phosphorus sources in the substantial absence (e.g., preferably less than about 20 percent of the total weight of the aluminum source and phosphorus source) of the titanium source. This procedure avoids adding the phosphorus source to a basic reaction mixture containing the titanium source and aluminum source, (as was done in most of the published attempts to substitute isomorphously $[PO_2]$ tetrahedra for $[SiO_2]$ tetrahedra in zeolitic structures). Although the reaction mechanism is by no means clear at this time, the function of the template may be to favor the incorporation of $[PO_2]$ and $[AlO_2]$ tetrahedra in the framework structures of the crystalline products with $[TiO_2]$ tetrahedra isomorphously replacing $[PO_2]$tetrahedra.

The reaction mixture from which these TAPOs are formed contains one or more organic templating agents (templates) which can be most any of those heretofore proposed for use in the synthesis of aluminosilicates and aluminophosphates. The template preferably contains at least one element of Group VA of the Periodic Table, particularly nitrogen, phosphorus, arsenic and/or antimony, more preferably nitrogen or phosphorus and most preferably nitrogen and are of the formula $R_4X^+$ wherein X is selected from the group consisting of nitrogen, phosphorus, arsenic and/or antimony and R may be hydrogen, alkyl, aryl, araalkyl, or alkylaryl group and is preferably aryl or alkyl containing between 1 and 8 carbon atoms, although more than eight carbon atoms may be present in "R" of group of the template. Nitrogen-containing templates are preferred, including amines and quaternary ammonium compounds, the latter being represented generally by the formula R′₄N⁺ wherein each R′ is an alkyl, aryl, alkylaryl, or araalkyl group; wherein R′ preferably contains from 1 to 8 carbon atoms or higher when R′ is alkyl and greater than 6 carbon atoms when R′ is otherwise, as hereinbefore discussed. Polymeric quaternary ammonium salts such as [(C₁₄H₃₂N₂)(OH)₂]ₓ wherein "x" has a value of at least 2 may also be employed. The mono-, di- and triamines, including mixed amines, may also be employed as templates either alone or in combination with a quaternary ammonium compound or another template. The exact relationship of various templates when concurrently employed is not clearly understood. Mixtures of two or more templating agents can produce either mixtures of TAPOs or in the instance where one template is more strongly directing than another template the more strongly directing template may control the course of the hydrothermal crystallization wherein with the other template serving primarily to establish the pH conditions of the reaction mixture.

Representative templates include tetramethylammonium, tetraethylammonium, tetrapropylammonium, tetrabutylammonium ions; di-n-propylamine; tripropylamine; triethylamine; triethanolamine; piperidine; cyclohexylamine; 2-methylpyridine; N,N-dimethylbenzylamine; N,N-diethylethanolamine; dicyclohexylamine; N,N-dimethylethanolamine; 1,4-diazabicyclo (2,2,2) octane; N-methyldiethanolamine, N-methyl-ethanolamine; N-methylcyclohexylamine; 3-methylpyridine; 4-methylpyridine; quinuclidine; N,N′-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. As will be readily apparent from the illustrative examples set forth hereinafter, not every template will produce every TAPO composition although a single template can, with proper selection of the reaction conditions, cause the formation of different TAPO compositions, and a given TAPO composition can be produced using different templates.

In those instances where an aluminum alkoxide is the reactive aluminum source, the corresponding alcohol is necessarily present in the reaction mixture since it is a hydrolysis product of the alkoxide. It has not as yet been determined whether this alcohol participates in the synthesis process as a templating agent, or in some other function and, accordingly, is not reported as a template in the unit formula of the TAPOs, although such may be acting as templates.

Alkali metal cations if present in the reaction mixture may facilitate the crystallization of certain TAPO phases, although the exact function of such cations, when present, in crystallization, if any, is not presently known. Alkali cations present in the reaction mixture generally appear in the formed TAPO composition, either as occluded (extraneous) cations and/or as structural cations balancing net negative charges at various sites in the crystal lattice. It should be understood that although the unit formula for the TAPOs does not specifically recite the presence of alkali cations they are not excluded in the same sense that hydrogen cations and/or hydroxyl groups are not specifically provided for in the traditional formulae for zeolitic aluminosilicates.

Most any reactive titanium source may be employed herein. The preferred reactive titanium sources include titanium alkoxides, water-soluble titanates and titanium chelates.

Most any reactive phosphorous source may be employed. Phosphoric acid is the most suitable phosphorus source employed to date. Accordingly, other acids of phosphorus are generally believed to be suitable phosphorus sources for use herein. Organic phosphates such as triethyl phosphate have been found satisfactory, and so also have crystalline or amorphous aluminophosphates such as the AlPO₄ compositions of U.S. Pat. No. 4,310,440. Organo-phosphorus compounds, such as tetrabutyl-phosphonium bromide have not, apparently, served as reactive sources of phosphorus, but these compounds do function as templating agents and may also be capable of being suitable phosphorus sources under proper process conditions (yet to be ascertained). Organic phosphorus compounds, e.g., esters, are believed to be generally suitable since they can generate acids of phosphorus in situ. Conventional phosphorus salts, such as sodium metaphosphate, may be used, at least in part as the phosphorus source, but they are not preferred.

Most any reactive aluminum source may be employed herein. The preferred reactive aluminum sources include aluminum alkoxides, such as aluminum isopropoxide, and pseudoboehmite. Crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but as generally not preferred.

Since the exact nature of the TAPO molecular sieves of the present invention are not clearly understood at present, although all are believed to contain [TiO₂] tetrahedra in the three-dimensional microporous crystal framework structure, it is advantageous to characterize the TAPO molecular sieves by means of their chemical composition. This is due to the low level of titanium present in certain of the instant molecular sieves prepared to date which makes it difficult to ascertain the exact nature of the interaction between titanium, aluminum and phosphorus. As a result, although it is believed that titanium, [TiO₂], has substituted isomorphously for [AlO₂] or [PO₂] tetrahedra, it is appropriate to characterize certain TAPO compositions by reference to their chemical composition in terms of the mole ratios of oxides in the as-synthesized and anhydrous form as:

wherein "R" represents at least one organic templating agent present in the intracrystalline pore system; "v" represents an effective amount of the organic templating agent to form said TAPO compositions and preferably has a value between and including zero and about 3.0; "p", "q" and "r" represent moles, respectively, of titanium, alumina and phosphorus pentaoxide, based on said moles being such that they are within the following values for "p", "q" and "r".

| Point | Mole Fraction | | |
|---|---|---|---|
| | p | q | r |
| A | 0.004 | 1.0 | 1.22 |
| B | 176 | 1.0 | 11.0 |
| C | 196 | 1.0 | 1 |
| D | 0.828 | 1.0 | 0.0143 |
| E | 0.003 | 1.0 | 0.427 |

The parameters "p", "q" and "r" are preferably within the following values for "p", "q" and "r":

| Point | Mole Fraction | | |
|---|---|---|---|
| | p | q | r |
| a | 0.008 | 1.0 | 1.0 |
| b | 1.0 | 1.0 | 1.0 |
| c | 0.80 | 1.0 | 0.60 |
| d | 0.333 | 1.0 | 0.50 |
| e | 0.067 | 1.0 | 0.663 |

The instant invention relates to a new class of crystalline molecular sieves in which at least two elements capable of forming three-dimensional microporous framework form crystal framework structures of $AlO_2^-$, $PO_2^+$ and $MO_2^n$ tetrahedral oxide units wherein "$MO_2^n$" represents at least two different elements present as tetrahedral units "$MO_2^n$" with charge "n" where "n" may be $-3$, $-2$, $-1$, $0$ or $+1$. These new molecular sieves exhibit ion-exchange, adsorption and catalytic properties and accordingly find wide use as adsorbents and catalysts. The members of this novel class of compositions have crystal framework structures of $AlO_2^-$, $PO_2^+$ and $MO_2^n$ units and have an empirical chemical composition on an anhydrous basis expressed by the formula:

$$mR:(M_xAl_yP_z)O_2$$

wherein "R" represents at least one organic templating agent present in the intracrystalline pore system; "m" represents the molar amount of "R" present per mole of $(M_xAl_yP_z)O_2$; "M" represents at least two elements capable of forming framework tetrahedral oxides; and "x", "y" and "z" represent the mole fractions of "M", aluminum and phosphorus, respectively, present as tetrahedral oxides. "M" is at least two different elements ($M_1$ and $M_2$) such that the molecular sieves contain at least two framework tetrahedral units in addition to $AlO_2^-$ and $PO_2^+$. "M" is at least one element selected from the group consisting of arsenic, beryllium, boron, chromium, gallium, germanium, lithium and vanadium and is at least one element selected from the group consisting of cobalt, iron, magnesium, manganese, titanium and zinc.

The molecular sieves of the instant invention will be generally referred to herein by the acronym or "ELAPO" to designate elements "M" in a framework of $AlO_2^-$, $PO_2^+$ and $MO_2^n$ tetrahedral units. Actual class members will be identified by replacing the "EL" of the acronym with the elements present as $MO_2^n$ tetrahedral units. For example, "MgBeAPO" designates a molecular sieve comprised of $AlO_2^-$, $PO_2^+$ and $MgO_2^{-2}$ and $BeO_2^{-2}$ tetrahedral units. To identify various structural species which make up each of the subgeneric classes, each species is assigned a number and is identified as "ELAPO-i" wherein "i" is an integer. The given species designation is not intended to denote a similarity in structure to any other species denominated by a similar identification system.

The instant invention relates to a new class of molecular sieves in which at least two elements capable of forming framework tetrahedral oxides are provided to form crystal framework structures of $AlO_2^-$, $PO_2^+$ and $MO_2^n$ tetrahedral wherein "M" represents at least two elements capable of forming tetrahedral units "$M_1O_2^n$" and "$M_2O_2^n$" where "$M_1$" and "$M_2$" are two different elements, where "n" is $-3$, $-2$, $-1$, $0$ or $+1$ and where "$M_1$" is at least one element selected from the group consisting of arsenic, beryllium, boron, chromium, gallium, germanium, lithium and vanadium and "$M_2$" is at least one element selected from the group consisting of cobalt, iron, magnesium, manganese, titanium and zinc. These new molecular sieves exhibit ion-exchange, adsorption and catalytic properties and accordingly find wide use as adsorbents and catalysts.

The members of this novel class of compositions have crystalline three-dimensional microporous framework structures of $AlO_2^-$, $PO_2^+$ and $MO_2^n$ tetrahedral units and have an empirical chemical composition on an anhydrous basis expressed by the formula:

$$mR:(M_xAl_yP_z)O_2;$$

wherein "R" represents at least one organic templating agent present in the intracrystalline pore system; "m" represents the molar amount of "R" present per mole of $(M_xAl_yP_z)O_2$ and has a value of zero to about 0.3; "M" represents at least two elements capable of forming framework tetrahedral oxides where "M" is at least one element selected from the group consisting of arsenic, beryllium, boron, chromium, gallium, germanium, lithium and vanadium; and at least one element selected from the group consisting of cobalt, iron, magnesium, manganese, titanium, and zinc.

The relative amounts of elements "M", aluminum and phosphorus are expressed by the empirical chemical formula (anhydrous):

$$mR:(M_xAl_yP_z)O_2$$

where "x", "y" and "z" represent the mole fractions of said "M", aluminum and phosphorus. The individual mole fractions of each "M" ($M_1$, $M_2$, $M_3$, etc.) may be represented by "$x_1$", "$x_2$", "$x_3$", etc. wherein "$x_1$", "$x_2$", and "$x_3$", and etc. represent the individual mole fractions of elements $M_1$, $M_2$, $M_3$, and etc. for "M" as above defined. The values of "$x_1$", "$x_2$", "$x_3$", etc. are as defined for "x", hereinafter, where "$x_1$"+"$x_2$"+"$x_3$"... ="x" and where $x_1$, $x_2$, $x_3$, etc. are each at least 0.01.

The molecular sieves of the instant invention have crystalline three-dimensional microporous framework structures of $MO_2^n$, $AlO_2^-$ and $PO_2^+$ tetrahedral units having an empirical chemical composition on an anhydrous basis expressed by the formula:

$$mR:(M_xAl_yP_z)O_2$$

wherein "R" represents at least one organic templating agent present in the intracrystalline pore system; "m" represents a molar amount of "R" present per mole of $(M_xAl_yP_z)O_2$ and has a value of zero to about 0.3; "M" represents at least two different elements capable of forming framework tetrahedral oxides, as hereinbefore defined, and "x", "y" and "z" represent the mole fractions of "M", aluminum and phosphorus, respectively, present as tetrahedral oxides; said mole fractions "x", "y" and "z" being generally defined as within the following values for "x", "y", and "z":

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |

| Point | Mole Fraction | | |
|---|---|---|---|
| | x | y | z |
| D | 0.98 | 0.01 | 0.01 |
| E | 0.39 | 0.60 | 0.01 |

In a preferred sub-class of the ELAPOs of this invention, the values of "x", "y" and "z" in the formula above are within the following values for "x", "y" and "z":

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

The ELAPOs of this invention are useful as adsorbents, catalysts, ion-exchangers, and the like in much the same fashion as aluminosilicates have been employed heretofore, although their chemical and physical properties are not necessarily similar to those observed for alumnosilicates.

ELAPO compositions are generally synthesized by hydrothermal crystallization from a reaction mixture containing reactive sources of the elements "M", aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ELAPO product are obtained, usually a period of from several hours to several weeks. Typical crystallization times are from about 2 hours to about 30 days with from about 2 hours to about 20 days being generally employed to obtain crystals of the ELAPO products. The product is recovered by any convenient method such as centrifugation or filtration.

In synthesizing the ELAPO compositions of the instant invention, it is preferred to employ a reaction mixture composition expressed in terms of the molar ratios as follows:

aR:(M$_x$Al$_y$P$_z$)O$_2$:bH$_2$O wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; "M" represents at least two elements, as above described, capable of forming tetrahedral oxide framework units, MO$_2^n$, with AlO$_2^-$ and PO$_2^+$ tetrahedral units; "n" has a value of $-3$, $-2$, $-1$, 0 or $+1$; and "x", "y" and "z" represent the mole fractions of "M", aluminum and phosphorus, respectively, "y" and "z" each have a value of at least 0.01 and "x" has a value of at least 0.02 with each element "M" having a mole fraction of at least 0.01. The mole fractions "x", "y" and "z" are preferably within the following values for "x", "y" and "z":

| Point | Mole Fraction | | |
|---|---|---|---|
| | x | y | z |
| F | 0.02 | 0.60 | 0.38 |
| G | 0.02 | 0.38 | 0.60 |
| H | 0.39 | 0.01 | 0.60 |
| I | 0.98 | 0.01 | 0.01 |
| J | 0.39 | 0.60 | 0.01 |

In the foregoing expression of the reaction composition, the reactants are normalized with respect to a total of $(M+Al+P)=(x+y+z)=1.00$ mole, whereas in many of the working examples appearing hereinafter the reaction mixtures are expressed in terms of molar oxide ratios and may be normalized to 1.00 mole of P$_2$O$_5$. This latter form is readily converted to the former form by routine calculations by dividing the total number of moles of "M", aluminum and phosphorus into the moles of each of "M", aluminum ad phosphorus. The moles of template and water are similarly normalized by dividing the total moles of "M", aluminum and phosphorus.

In forming the reaction mixture from which the instant molecular sieves are formed the organic templating agent can be any of those heretofore proposed for use in the synthesis of conventional zeolite aluminosilicates. In general these compounds contain elements of Group VA of the Periodic Table of Elements, particularly nitrogen, phosphorus, arsenic and antimony, preferably nitrogen or phosphorus and most preferably nitrogen, which compounds also contain at least one alkyl or aryl group having from 1 to 8 carbon atoms. Particularly preferred compounds for use as templating agents are the amines, quaternary phosphonium compounds and quaternary ammonium compounds, the latter two being represented generally by the formula R$_4$X$^+$ wherein "X" is nitrogen or phosphorus and each R is an alkyl or aryl group containing from 1 to 8 carbon atoms. Polymeric quaternary ammonium salts such as [(C$_{14}$H$_{32}$N$_2$)(OH)$_2$]$_x$ wherein "x" has a value of at least 2 are also suitably employed. The mono-, di- and tri-amines are advantageously utilized, either alone or in combination with a quaternary ammonium compound or other templating compound. Mixtures of two or more templating agents can either produce mixtures of the desired ELAPOs or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; tetrapentylammonium ion; di-n-propylamine; tripropylamine; triethylamine; triethanolamine; piperidine; cyclohexylamine; 2-methylpyridine; N,N-dimethylbenzylamine; N,N-dimethylethanolamine; choline; N,N'-dimethylpiperazine; 1,4-diazabicyclo (2,2,2,) octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrrolidine; and 2-imidazolidone. Not every templating agent will direct the formation of every species of ELAPO, i.e., a single templating agent can, with proper manipulation of the reaction conditions, direct the formation of several ELAPO compositions, and a given ELAPO composition can be produced using several different templating agents.

The most suitable phosphorus source yet found for the present process is phosphoric acid, but organic phosphates such as triethyl phosphate may be satisfactory, and so also may crystalline or amorphous aluminophosphates such as the AlPO₄ composition of U.S. Pat. No. 4,310,440. Organo-phosphorus compounds, such as tetrabutylphosphonium bromide, do not apparently serve as reactive sources of phosphorus, but these compounds may function as templating agents. Conventional phosphorus salts such as sodium metaphosphate, may be used, at least in part, as the phosphorus source, but are not preferred.

The preferred aluminum source is either an aluminum alkoxide, such as aluminum isoproproxide, or pseudo-boehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The elements "M" can be introduced into the reaction system in any form which permits the formation in situ of reactive form of the element, i.e., reactive to form the framework tetrahedral oxide unit of the element. The organic and inorganic salts, of "M" such as oxides, alkoxides, hydroxides, halides and carboxylates, may be employed including the chlorides, bromides, iodides, nitrates, sulfates, acetates, formates, ethoxides, propoxides and the like.

While not essential to the synthesis of ELAPO compositions, stirring or other moderate agitation of the reaction mixture and/or seeding the reaction mixture with seed crystals of either the ELAPO species to be produced or a topologically similar species, such as aluminophosphate, aluminosilicate or molecular sieve compositions, facilitates the crystallization procedure.

After crystallization the ELAPO product may be isolated and advantageously washed with water and dried in air. The as-synthesized ELAPO generally contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular ELAPO species. As a general rule the templating agent, and hence the occluded organic species, is too large to move freely through the pore system of the ELAPO product and must be removed by calcining the ELAPO at temperatures of 200° C. to 700° C. to thermally degrade the organic species. In a few instances the pores of the ELAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein does not include the condition of the ELAPO phase wherein the organic moiety occupying the intracrystalline pore system as a result of the hydrothermal crystallization process has been reduced by post-synthesis treatment such that the value of "m" in the composition formula $$mR:(M_xAl_yP_z)O_2$$

has a value of less than 0.02. The other symbols of the formula are as defined hereinabove. In those preparations in which an alkoxide is employed as the source of element "M", aluminum or phosphorus, the corresponding alcohol is necessarily present in the reaction mixture since it is a hydrolysis product of the alkoxide. It has not been determined whether this alcohol participates in the synthesis process as a templating agent. For the purposes of this application, however, this alcohol is arbitrarily omitted from the class of templating agents, even if it is present in the as synthesized ELAPO material.

Since the present ELAPO compositions are formed from $MO_2^n$, $AlO_2$, and $PO_2^+$ tetrahedral ox units which, respectively, have a net charge of "n", (where "m" may be $-3$, $-2$, $-1$, 0 or $+1$), $-1$ and $+1$, the matter of cation exchangeability is considerably more complicated than in the case of zeolitic molecular sieves in which, ideally, there is a stoichiometric relationship between $AlO_2^-$ tetrahedra and charge-balancing cations. In the instant compositions, an $AlO_2^-$ tetrahedron can be balanced electrically either by association with a $PO_2^+$ tetrahedron or a simple cation such as an alkali metal cation, a proton ($H^+$), a cation of "M" present in the reaction mixture, or an organic cation derived from the templating agent. Similarly an $MO_2^n$ where "n" is negative, can be balanced electrically by association with $PO_2^+$ tetrahedra, a cation of "M" present in the reaction mixture, organic cations derived from the templating agent, a simple cation such as an alkali metal cation, or other divalent or polyvalent metal cation, a proton ($H^+$), anions or cations introduced from an extraneous source. It has also been postulated that non-adjacent $AlO_2^-$ and $PO_2^+$ tetrahedral pairs can be balanced by $Na^+$ and $OH^-$ respectively [Flanigen and Grose, Molecular Sieve Zeolites-I, ACS, Washington, DC (1971)].

The ELAPO compositions of the present invention may exhibit cation-exchange capacity when analyzed using ion-exchange techniques heretofore employed with zeolitic aluminosilicates and have pore diameters which are inherent in the lattice structure of each species and which are at least about 3Å in diameter. Ion exchange of ELAPO compositions is ordinarily possible only after the organic moiety derived from the template, present as a result of synthesis, has been removed from the pore system. Dehydration to remove water present in the as-synthesized ELAPO compositions can usually be accomplished, to some degree at least, in the usual manner without removal of the organic moiety, but the absence of the organic species greatly facilitates adsorption and desorption procedures. The ELAPO materials have various degrees of hydrothermal and thermal stability, some being quite remarkable in this regard, and function well as molecular sieve adsorbents and hydrocarbon conversion catalysts or catalyst bases.

NZ-MS CATALYSTS

The specific NZ-MSs employed in the instant invention are characterized in their calcined form by an adsorption of isobutane of at least 2 percent by weight at a partial pressure of 500 torr and a temperature of 20° C. The NZ-MS's are preferably also characterized in their calcined form by an adsorption of triethylamine of from zero to less than 5 percent by weight, preferably less than 3 weight percent, at a partial pressure of 2.6 torr and a temperature of 22° C.

The NZ-MSs employed herein are characterized by the aforementioned adsorption criteria. Certain NZ-MS species which may be employed herein are designated in one or more of the aforementioned classes of NZ-MS by an "−n" designation of −5, −11, −31, −33, −36, −37, −40 and −41 to the extent such meet the aforementioned adsorption criteria. NZ-MSs characterized by the above described adsorption of isobutane include, but are not limited to, ELAPSO-5, ELAPSO-11, ELAPSO-31, ELAPSO-40, ELAPSO-41, CoAPSO-5, CoAPSO-11, CoAPSO-31, FeAPSO-5, FeAPSO-11, FeAPSO-31, MgAPSO-11, MgAPSO-31, MnAPSO-11, MnAPSO-31, TiAPSO-11, ZnAPSO-11, ZnAPSO-31, CoMgAPSO-11, CoMnMgAPSO-11, MeAPO-5, MeAPO-11, MeAPO-31, TiAPO-11, TiAPO-31, FeAPO-11, ELAPO-11, ELAPO-31, ELAPO-40, ELAPO-41 SAPO-11, SAPO-31, SAPO-37, SAPO-40, SAPO-41 and mixtures thereof.

The above characterization of the NZ-MSs employed in the instant invention relates to an adsorption characterization that is carried out on a NZ-MS which has been subjected to a post synthesis treatment, e.g., calcination or chemical treatment, to remove a substantial portion of the template "R" which is present as a result of synthesis. Although a particular NZ-MS is characterized herein by reference to its adsorption of isobutane or triethylamine as relating to the adsorption characteristics of the NZ-MS in its calcined form, the instant invention necessarily includes the use of a non-calcined or modified NZ-MSs which are characterized by such adsorption in the modified or calcined form, since upon use of such a non-calcined NZ-MS in the instant process at effective dewaxing conditions the NZ-MS will be calcined or hydrothermally treated in situ so as to have the characteristic adsorption of isobutane or triethylamine. Thus, the NZ-MS will be rendered in situ to a form characterized by the aforementioned adsorption characteristics. For example, an as-synthesized MgAPSO-11 or SAPO-11 are not characterized by the aforementioned adsorption of isobutane due to the presence of template "R" which is present as a result of synthesis, although the calcined form of MgAPSO-11 and SAPO-11 are characterized by the aforementioned adsorption of isobutane. Thus, reference to a NZ-MS having a particular adsorption characteristic in its calcined form is not intended to exclude the use of the NZ-MS in its as-synthesized form which upon in-situ calcination, hydrothermal treatment and/or other treatment, e.g., ion exchange with suitable atoms, would have such adsorption characteristics.

The NZ-MSs of the instant invention may be employed in conjunction with traditional dewaxing and/or hydrocracking catalysts and accordingly, optionally, a zeolitic aluminosilicate component may be employed in conjunction with the NZ-MS-containing catalysts. The zeolitic aluminosilicate component of such catalysts may be any aluminosilicate heretofore employed as a component in dewaxing catalysts. Representative of the zeolitic aluminosilicates disclosed heretofore as employable as component parts of traditional dewaxing catalysts are Zeolite Y, steam stabilized Zeolite Y (ultra-stable Y), Zeolite X, Zeolite beta (U.S. Pat. No. 3,308,069), Silicalite (U.S. Pat. No. 4,061,724),, Zeolite KZ-20 (U.S. Pat. No. 3,445,727), Zeolite ZSM-3 (U.S. Pat. No. 3,415,736), faujasite, LZ-10 (U.K. Pat. No. 2,014,970, June 9, 1982), US-Y, ZSM-type zeolites, erionite, mordenite, offretite, chabazite, FU-1-type zeolite, NU-type zeolities and mixtures thereof. Traditional cracking catalysts containing amounts of $Na_2O$ less than about one percent by weight are generally preferred.

Zeolite Y is disclosed in U.S. Pat. No. 3,130,007; and steam stabilized Y Zeolites, e.g., ultra-stable Y-type zeolites.

Another zeolitic aluminosilicate employable herein is "LZ-210", is described in E.P.C. Publication No. 82,211 published June 29, 1983, incorporated herein by reference thereto. In one embodiment the LZ-210 containing hydrocracking catalysts disclosed in copending U.S. Ser. No. 490.951, filed May 2, 1983, now abandoned, incorporated herein by reference, may be employed as an optional component of the catalyst.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly describing U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference. In addition, crystalline silicates such as silicalite (U.S. Pat. No. 4,061,724) may be employed with the NZ-MSs of the instant invention.

FORMULATION OF NZ-MS DEWAXING CATALYSTS

The catalysts of the instant invention comprise at least one NZ-MS, as above characterized, and optionally, may also contain a hydrogenation catalyst and/or one or more traditional dewaxing catalysts and/or hydrocracking catalysts, including zeolitic aluminosilicate components. The relative amount of the NZ-MS component or traditional hydroprocessing component, if any, will depend at least in part, on the selected hydrocarbon feedstock and on the desired pour point of the product, but in all instances an effective amount of at least one NZ-MS is employed. When a zeolitic aluminosilicate is employed as a part of the traditional dewaxing component the relative weight ratio of the zeolitic aluminosilicate to the NZ-MS is generally between about 1:10 and about 500:1, desirably between about 1:10 and about 200:1, preferably between about 1:2 and about 50:1, and most preferably is between about 1:1 and about 20:1. The zeolitic aluminosilicate and NZ-MS may be ion-exchanged with a selected cation(s) and/or thermally treated either before or after mixture with each other or after such have been added separately or concurrently to one or more inorganic oxide matrix components. When the NZ-MS molecular sieves are ion exchanged such are preferably exchanged with a hydrogen-forming cation species, e.g. $NH_4^+$, $H^+$, quaternary ammonium cations, etc. The NZ-MS preferably has at least part of its cations as hydrogen-forming cation species.

Hydrodewaxing catalysts may optionally contain a hydrogenation component of the type commonly employed in dewaxing catalysts. The hydrogenation component may be selected from the group of hydrogenation catalysts consisting of one or more metals of Group VI B and Group VIII, including the salts, complexes and solutions containing such metals. The preferred hydrogenation catalyst is at least one of the group of metals, salts and complexes selected from the group consisting of at least one of platinum, palladium, rhodium, ruthenium, iridium and mixtures thereof or at least one from the group consisting of nickel, molybdenum, cobalt, tungsten, titanium, chromium and mixtures thereof. As recognized in the art, the noble and base metals will not generally be employed in the same catalyst system. Reference to the catalytically active metal or metals is intended to encompass such metal or metals in the elemental state or in some form such as an oxide, sulfide, halide, carboxylate and the like.

The hydrogenation component is present in an effective amount to provide an effective hydrodewaxing catalyst. When the hydrogenation catalyst is a noble metal it is generally present in an amount between about 0.05% and about 1.5% by weight based on the total weight of the dewaxing catalyst including the weight of any binder or matrix material which may be present, as hereinafter discussed, although effective amounts outside this range may be employed. Although effective amounts in excess of 1.5 percent by weight may be employed, the preferred effective amount of the noble metal hydrogenation component is between about 0.3% and about 1.2% by weight. When the hydrogenation catalyst is a base metal(s) the effective amount will generally be between about 1.0% and about 30% percent by weight or more of the base metal, expressed as the oxide(s), based on the total weight of the dewaxing catalyst, although effective amounts outside this range may be employed.

The final form of the hydrogenation component is not narrowly limited herein but may be a metal oxide, metal sulfide or other catalytically active form. Since sulfur is typically present in the hydrocarbon feedstock being treated, the actual form of some of the hydrogenation component(s) may well be at least in part a sulfide due to in situ reactions. When a noble metal is employed as the hydrogenation component the catalyst is generally activated in air and then reduced in a hydrogen atmosphere. When base metals are employed such are usually treated with a sulfur compound.

The hydrogenation components can be incorporated into the overall catalyst composition by any one of numerous procedures. In general it has been observed that it is desirable to add the hydrogenation component to the catalyst as a separate component rather than provide such by ion exchange or impregnation of the NZ-MS component. They can be added either to the NZ-MS component, zeolitic aluminosilicate component, if any, or to any metal oxide or to a combination thereof by ion exchange, impregnation and the like. In the alternative, multiple hydrogenation components (two or more) may be added as powders in the formulation of the catalyst. They may be added by co-mulling, impregnation, or ion exchange whereby one or more may be added to NZ-MS and/or zeolitic aluminosilicate by impregnation, co-mulling or co-precipitation. For example, noble or base metal compounds, such as the sulfides, oxides or water-soluble salts, can be added by co-mulling, impregnation or precipitation before the composite is finally calcined. In the alternative these components can be added to the finished particle by impregnation with an aqueous, alcoholic, hydrocarbon or other nonaqeous solution of soluble compounds or precursors.

Although the hydrogenation components can be combined with the NZ-MS and/or zeolitic aluminosilicate, if any, as the oxides such is generally not the case. They are usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

It is well known in the art that dewaxing catalysts, are generally employed with a binder material or, as commonly referred to, with an inorganic oxide matrix which can be inert or also catalytically active. For example inorganic matrices such as clay, silica, alumina, silica-alumina, silica-zirconia, silica-magnesia, alumina-boria, alumina-titania and the like and mixtures thereof may be employed. An inorganic oxide need not always be employed such as in the case of a preform containing the NZ-MS or may be employed in an amount between about 1% and about 95% by weight, preferably between about 10% and about 80% by weight, based on the total weight of the dewaxing catalyst.

The term "crude oil feedstock" is used herein to denominate any crude oil feedstock or portion thereof and includes full range crude oils from primary, secondary or tertiary recovery from conventional or offshore oil fields and to the myriad of feedstocks derived therefrom. "Crude oil feedstocks" may also be "syncrudes" such as those that can be derived from coal, Fischer Tropsch fuel products, shale oil, tar sands and bitumens. The crude oil feedstock may be virgin (straight run) or generated synthetically by blending. Such crude oil feedstocks are traditionally desalted prior to use since sodium chloride is known to be a poison in many hydroprocessing operations. Further, the term "crude oil feedstocks" is intended to include component parts of crude oils which have heretofore been generally employed as feedstocks or potential feeds and includes feeds such as distillate gas oils, heavy vacuum gas oils, VGO, atmospheric and vacuum resids, syncrudes, pulverized coal and fractions boiling above the traditional end of the gasoline boiling range which generally includes compounds containing greater than about eleven carbon atoms and combinations thereof.

The hydrocarbon feedstock for dewaxing typically boils above 350° F., preferably between about 400° F. and 1200° F. and more preferably between about 400° F. and about 900° F. The hydrocarbon feedstock may be pre-treated in a hydrotreater to reduce, i.e. remove, compounds which contain sulfur and/or nitrogen. The hydrocarbon feedstock may have a significant sulfur content, present as hydrogen sulfide, ranging from 0.1 to 3 weight percent, and nitrogen content, present as ammonia, in an amount up to 20,000 ppm. Temperature, space velocity, and other process variables may be adjusted to compensate for the effects of nitrogen on the dewaxing catalyst activity. The feedstock is contacted in the dewaxing reaction zone with the dewaxing catalyst and, optionally, in the presence of hydrogen-containing gas. In hydrodewaxing, hydrogen is consumed in the hydrodewaxing process and an excess of hydrogen is typically maintained in the reaction zone. Advantageously, a hydrogen-to-oil (feed) ratio of at least 1,000 standard cubic feet of hydrogen per barrel of feed (SCFB) is employed, and the hydrogen-to-oil ratio may range up to 20,000 SCFB. Preferably, about 4,000 to 12,000 SCFB is employed. Typical dewaxing and hydrodewaxing conditions are disclosed in U.S. Pat. No. Re 28,398, U.S. Pat. No. 3,852,189 and U.S. Pat. No. 4,282,085.

The instant process is carried out under effective catalytic dewaxing or hydrodewaxing conditions. Catalytic dewaxing is generally carried out at a LHSV (liquid hourly space velocity) between about 0.2 and about 50, a temperature between about 500° F. and about 1200° F., a pressure between about subatmospheric and about 500 atmospheres. Hydrodewaxing is generally carried out at a LHSV between about 0.1 and about 15, a temperature between about 400° F. and about 900° F., at a pressure between about 10 psig and about 2500 psig and using molar ratios of hydrogen to hydrocarbon feedstock between about 1 and about 100.

The following examples were carried out to demonstrate the use of the dewaxing catalysts and dewaxing processes of the invention and are not intended to be limiting thereof.

Examples 1 to 3

Three catalysts were prepared for evaluation as dewaxing catalysts and were denominated Catalysts A, B and C. All weights are given as anhydrous weights unless otherwise designated. The catalysts were prepared as follows:

(a) Catalyst A is a catalyst according to the invention and was prepared using SAPO-11. SAPO-11 was prepared according to example 17 of U.S. Pat. No. 4,440,871, except that the digestion time was 24 hours. Catalyst A was prepared by blending 80 grams of SAPO-11 with 80 grams of a nickel-tungsten-alumina catalyst, 100 grams of a silica sol (40 percent by weight silica in water) and an ammonium acetate solution (4 grams of ammonium acetate in 70 cubic centimeters (cc) of water). The mixture was extruded as 1/16 inch extrudates and dried at 100° C. for about 16 hours and calcined in air at 500° C. for 2 hours. The calcination at 500° C. was carried out in a stepwise manner by heating the catalyst from room temperature to 220° C. over a one hour period, heating the catalyst at 220° C. for 1.5 hours, heating the catalyst from 220° C. to 500° C. over a one hour period and then heating the catalyst at 500° C. for 2 hours. The nickel-tungsten alumina hydrogenation component was prepared by pore filling 85 grams of a pseudoboehmite alumina with an aqueous solution (119 cc) containing 31.5 grams of $Ni(NO_3)_2 \cdot 6H_2O$ and 33.7 grams ammonium metatungstate. The mixture was dried as above described for Catalyst A except the final temperature was 480° C. instead of 500° C. Catalyst A, expressed as the weight percent oxides, was prepared to be: 35% SAPO-11, 35% $Al_2O_3$, 17% $SiO_2$, 3% NiO and 10% $WO_3$. Chemical analysis of Catalyst A for NiO and $WO_3$ gave 2.8 wt. % NiO and 9.6 wt. % $WO_3$.

(b) Catalyst B was prepared according to this invention using a SAPO-31 prepared according to example 51 of U.S. Pat. No. 4,440,871. SAPO-31 (72 grams) was blended with 46.5 grams of an aqueous silica solution (40 wt. % silica). The mixture was extruded into 1/16 inch pellets which were dried at 100° C. and calcined at 500° C., by the procedure above described for Catalyst A. The calcined extrudates were treated in air (saturated with water at 25° C.) at 650° C. for three hours. The chemical composition of the catalyst was prepared to be 80 wt. % SAPO-31 and 20 wt. % $SiO_2$.

(c) Catalyst C is a comparative catalyst and was prepared using SAPO-34. SAPO-34 was prepared according to the procedure of examples 32 to 38 of U.S. Pat. No. 4,440,871. SAPO-34 is not characterized by an isobutane adsorption of at least 2 percent by weight at a partial pressure of 500 torr and a temperature of 20° C. whereas SAPO-11 and SAPO-31 are so characterized. Catalyst C was prepared by mixing 30 grams of SAPO-34 with 50 grams of an alumina sold under the trade designation "PA" by American Cyanamid, Stamford, CT.), and 20 grams of a pseudoboehmite alumina. The above mixture was mixed with 3 cc of concentrated nitric acid and 50 cc of water and extruded as 1/16 inch extrudates. The extrudates were dried at 100° C. and calcined at 500° C. by the procedure above described for Catalyst A. The extrudates (53 grams) were pore filled by mixing them with a solution (35 cc) containing 10.7 grams of $Ni(NO_3)_2 \cdot 6H_2O$ and 20.9 grams of ammonium metatungstate. The extrudates were then dried at 500° C. as above described for Catalyst A. Catalyst C expressed as the weight percent oxides, was prepared to give: 3.5% NiO, 22% $WO_3$, 22.4% SAPO-34 and 52.2% alumina.

EXAMPLE 4

The catalysts of examples 1 to 3 were evaluated for hydrodewaxing and their use in reducing the pour point of hydrocarbon feedstocks by contacting a selected feedstock with hydrogen at a total pressure of 2000 psig at a Liquid Hourly Space Velocity (LHSV) between 0.25 to 0.8 and a hydrogen flow rate of 10,000 SCFB (Standard Cubic Feet per Barrel) at temperatures between about 700° F. and 800° F. Products boiling below 600° F. were collected and evaluated and the conversion given based on these products. The feedstock employed in the dewaxing examples set forth hereinafter was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

| | Weight Percent |
|---|---|
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

The reactor effluents were collected and the fraction of the feed ("Conversion" on a weight basis) converted to products boiling below 600° F. determined by simulated distillation (ASTM test method D-2887). The conversion is reported as the weight percent of feedstock converted to products boiling below 600° F. The pour points were determined by ASTM test method D-97-66 on the reactor effluents after maintaining the effluent at about 130° F. during its collection. The results in Tables A, B, C and D demonstrate that at comparable conversions that Catalysts A and B provided a reduction in the pour point of the products superior to that obtained by use of Catalyst C. The data in Tables A and C are graphically depicted in FIG. 1 and show the decrease in pour point as a function of conversion of products obtained using SAPO-11 (Catalyst A) as compared to SAPO-34 (Catalyst C). The data in Tables B and D are graphically depicted in FIG. 2 and show the decrease in pour point as a function of conversion of products obtained using SAPO-31 (Catalyst B) as compared to SAPO-34 (Catalyst C). FIGS. 1 and 2 demonstrate the decrease in the pour point of the products obtained by Catalyst A and B as compared to Catalyst C. Further, the decrease in pour point increases at a greater rate using Catalysts A and B with increasing conversion, indicating Catalysts A and B are more selective dewaxing catalyts.

TABLE A

| (CATALYST A) | | | |
|---|---|---|---|
| Temp., °F. | LHSV | Conv. | Pour Point, °F. |
| 701 | 0.25 | 17.3 | 40 |
| 749 | 0.25 | 39.8 | −15 |
| 725 | 0.25 | 28.5 | 10 |

TABLE B

| (CATALYST B) | | | |
|---|---|---|---|
| Temp., °F. | LHSV | Conv. | Pour Point, °F. |
| 725 | 1.0 | 4.3 | 75 |
| 749 | 1.0 | 6.9 | 65 |
| 772 | 1.0 | 13.0 | 50 |
| 801 | 1.0 | 26.5 | 25 |

TABLE C

| (CATALYST C) | | | |
|---|---|---|---|
| Temp., °F. | LHSV | Conv. | Pour Point, °F. |
| 702 | 0.25 | 17.6 | 85 |
| 725 | 0.25 | 23.3 | 80 |
| 750 | 0.25 | 35.0 | 75 |
| 774 | 0.25 | 47.1 | 60 |

TABLE D

| (CATALYST C) | | | |
|---|---|---|---|
| Temp., °F. | LHSV | Conv. | Pour Point, °F. |
| 776 | 1.0 | 29.9 | 80 |
| 753 | 1.0 | 18.1 | 85 |
| 752 | 1.0 | 17.0 | 85 |

EXAMPLE 5

A catalyst was prepared employing SAPO-11 to demonstrate the hydrodewaxing functionality of the catalysts of this invention. SAPO-11 was prepared according to the procedure described in example 18 of U.S. Pat. No. 4,440,871, except the final molar ratio of di-n-propylamine to $Al_2O_3$ was 1.0 to 1. The catalyst was prepared by mixing 150 grams of SAPO-11 with 100 grams of Kaiser medium density alumina and a sufficient amount of water to form an extrudate mixture (paste). The mixture was extruded into 1/16 inch extrudates and dried in air at 100° C. for 16 hours. The extrudates were then calcined in air at 480° C. for 2 hours. The extrudates (153 gram) were then mixed (pore filled) with 150 cc of an aqueous solution containing 40.0 grams of nickel nitrate hexahydrate and 48 grams of ammonium metatungstate. The mixture was then dried for 16 hours at 100° C. and then calcined at 480° C. for 2 hours. The catalyst was prepared to contain, given as the weight percent oxide: 5 wt. % NiO; 23 wt. % $WO_3$; 36 wt. % SAPO-11; and 36% $Al_2O_3$. Chemical analysis for NiO and $WO_3$ gave 5.4 wt. % NiO and 23.0 wt. % $WO_3$.

The catalyst was evaluated by contacting a selected feedstock with hydrogen at a total pressure of 2000 psig at a Liquid Hourly Space Velocity (LHSV) of one and a hydrogen flow rate of 10,000 SCFB (Standard Cubic Feed per Barrel) at temperatures between about 700° F. and 840° F. Products boiling below 600° F. were collected and evaluated and the conversion given based on these products. The feedstock employed in this example was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

| | Weight Percent |
|---|---|
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

The reactor effluents were collected and the fraction of the feed (weight basis) converted to products boiling below 600° F. determined by simulated distillation. The conversion is reported as the weight percent of feedstock converted to products boiling below 600° F. The pour points were determined according to ASTM test method D-97-66 as in example 4.

The conversion and pour point were as follows:

| Temperature (°F.) | Conversion | Pour Point (°F.) |
|---|---|---|
| 700 | 7.52 | 85 |

-continued

| Temperature (°F.) | Conversion | Pour Point (°F.) |
|---|---|---|
| 724 | 9.84 | 80 |
| 749 | 17.95 | 70 |
| 769 | 30.06 | 55 |
| 788 | 41.60 | 25 |
| 797 | 36.64 | 35 |
| 788 | 29.89 | 40 |
| 788 | 33.74 | 45 |
| 807 | 43.64 | 30 |
| 821 | 45.12 | 30 |
| 822 | 45.50 | 30 |
| 840 | 56.88 | 20 |

The above date demonstrate the conversion of the higher boiling feedstock to lower boiling products in the presence of hydrogen and that such products are characterized by a lower pour point than the initial feedstock.

What is claimed is:

1. The process for dewaxing a hydrocarbon feedstock to reduce its pour point comprising contacting the hydrocarbon feedstock at effective dewaxing conditions with a dewaxing catalyst comprising an effective amount of at least one NZ-MS selected from the group consisting of SAPO, ELAPSO, MeAPO, FeAPO, TiAPO, and ELAPO molecular sieves, and characterized in its calcined form by an adsorption of isobutane of at least 2 percent by weight at a pressure of 500 torr and a temperature of 20° C.

2. The process for hydrodewaxing a hydrocarbon feedstock to reduce its pour point comprising contacting the hydrocarbon feedstock with a catalyst in the presence of hydrogen at effective hydrodewaxing conditions wherein the catalyst comprises at least one hydrogenation component in an amount effective to provide an effective hydrodewaxing catalyst and at least one NZ-MS selected from the group consisting of SAPO, ELAPSO, MeAPO, FeAPO, TiAPO, and ELAPO molecular sieves, and characterized in its calcined form by an adsorption of isobutane of at least 2 percent by weight at a pressure of 500 torr and a temperature of 20° C.

3. The process of claim 1 or claim 2 wherein said catalyst further comprises an effective amount of at least one zeolitic aluminosilicate having dewaxing activity wherein said zeolitic aluminosilicate is present in a weight ratio between about 1:10 and about 500:1 of said zeolitic aluminosilicate to said NZ-MS molecular sieve.

4. The process of claim 3 wherein the weight ratio of zeolitic aluminosilicate to said NZ-MS is between about 1:2 and about 50:1.

5. The process of claim 4 wherein the weight ratio of zeolitic aluminosilicate to said NZ-MS is between about 1:1 and about 20:1.

6. The process of claim 1 or 2 wherein said catalyst comprises an inorganic oxide matrix component present in an amount between about 0 and about 99 percent by weight, based on the total weight of said catalyst.

7. The process of claim 6 wherein said inorganic oxide matrix component is present in an amount between about 5 and about 95 percent by weight.

8. The process of claim 1 or claim 2 wherein said NZ-MS has at least part of its cations as hydrogen-forming species.

9. The process of claim 8 wherein said hydrogen-forming species is $NH_4^+$ or $H^+$.

10. The process of claim 1 wherein the process is carried out by contacting a hydrocarbon feedstock boiling between 400° F. and about 1200° F. with said catalyst at a temperature between about 500° F. and about 1200° F., at a pressure between about subatmospheric to about 500 atmospheres and a LHSV between about 0.2 and about 50.

11. The process of claim 2 wherein the process is carried out by contacting a hydrocarbon feedstock boiling between about 400° F. and about 1200° F., in the presence of hydrogen with said catalyst at a temperature between about 400° F. and about 900° F., at a pressure between about 10 psig. and about 2500 psig., and at a molar ratio of hydrogen to hydrocarbon feedstock between about 1 and about 100.

12. The process of claim 3 wherein said zeolitic aluminosilicate is ZSM-5.

13. The process of claim 7 wherein said inorganic oxide matrix component is selected from the group consisting of clays, silicas, aluminas, silica-aluminas, silica-zirconias, silica-magnesia, alumina-borias, alumina-titanias and mixtures thereof.

14. The process of claim 1 or claim 2 wherein said NZ-MS is selected from the group consisting of CoAPSOs, FeAPSOs, MgAPSOs, MnAPSOsm TiAPSOs, ZnAPSOs, CoMgAPSOs, CoMnMgAPSOs, MeAPOs, TiAPOs, FeAPOs, ELAPOs and mixtures thereof.

15. The process of claim 1 or claim 2 wherein said NZ-MS is selected from the group consisting of CoAPSOs, FeAPSOs, MgAPSOs, MnAPSOs, TiAPSOs, ZnAPSOs, CoMgAPSOs, CoMnMgAPSOs and mixtures thereof.

16. The process of claim 1 or claim 2 wherein said NZ-MS is selected from the group consisting of ELAPSO-5, ELAPSO-11, ELAPSO-31, ELAPSO-40, ELAPSO-41 and mixtures thereof.

17. The process of claim 16 wherein said NZ-MS is selected from the group consisting of CoAPSOs, FeAPSOs, MgAPSOs, MnAPSOs, TiAPSOs, ZnAPSOs, CoMgAPSOs, CoMnMgAPSOs and mixtures thereof.

18. The process of claim 1 or claim 2 wherein said NZ-MS is selected from the group consisting of MeAPSOs, TiAPSOs, FeAPOs, ELAPOs and mixtures thereof.

19. The process of claim 18 wherein "Me" is selected from the group consisting of cobalt, magnesium, manganese, zinc and mixtures thereof.

20. The process of claim 18 wherein "Me" is selected from the group consisting of magnesium, manganese and mixtures thereof.

21. The process of claim 1 or claim 2 wherein said hydrocarbon feedstock is selected from the group consisting of heating fuel, jet fuel, lube oils, distillate gas oils, naphtha, reformate, kerosene, diesel fuel, vacuum gas oils, Fischer Tropsch fuel product, atmospheric residual oils, vacuum residual oils, syncrudes, pulverized coal and mixtures thereof.

22. The process of claim 3 wherein said zeolitic aluminosilicate is selected from the group consisting of zeolite Y, ultra-stable Y zeolites, zeolite X, zeolite beta, zeolite KZ-20, faujasite, LZ-210, LZ-10, ZSM-type zeolites selected from the group consisting of ZSM-5, ZSM-11, ZSM-12, ZSM-23, ZSM-35, ZSM-38 and ZSM-48, and mixtures thereof.

23. The process according to claim 2 wherein the hydrogenation component is at least one metal selected from the group consisting of Pt, Pd, Rh, Ru, Ni, W, Mo, Co, Ti, Cr and mixtures thereof.

24. The process of claim 23 wherein said metal is selected from the group consisting of Pt, Pd, Rh, Ru and mixtures thereof and is present in an effective amount between about 0.05 weight percent and about 1.5 weight percent.

25. The process of claim 23 wherein the metal is selected from the group consisting of Ni, W, Mo, Co, Ti, Cr and mixtures thereof and is present in an amount between about 1.0 and about 30 percent by weight.

26. The process for dewaxing a hydrocarbon feedstock to reduce its pour point comprising contacting the hydrocarbon feedstock at effective dewaxing conditions with a dewaxing catalyst comprising an effective amount of at least one SAPO characterized in its calcined form by an adsorption of isobutane of at least 2 percent by weight at a pressure of 500 torr and a temperature of 20° C.

27. The process for hydrodewaxing a hydrocarbon feedstock to reduce its pour point comprising contacting the hydrocarbon feedstock with a catalyst in the presence of hydrogen at effective hydrodewaxing conditions wherein the catalyst comprises at least one hydrogenation component in an amount effective to provide an effective hydrodewaxing catalyst and at least one SAPO characterized in its calcined form by an adsorption of isobutane of at least 2 percent by weight at a pressure of 500 torr and temperature of 20° C.

28. The process of claim 26 or 27 wherein said catalyst further comprises an effective amount of at least one zeolitic aluminosilicate having dewaxing activity.

29. The process of claim 26 or 27 wherein said SAPO is SAPO-11 or SAPO-31.

30. The process of claim 26 or 27 wherein said SAPO is further characterized in its calcined form by an adsorption of triethylamine of from zero to less than 5 percent by weight at a pressure of 2.6 torr and a temperature of 22° C.

31. The process for dewaxing a hydrocarbon feedstock to reduce its pour point comprising contacting the hydrocarbon feedstock at effective dewaxing conditions with a dewaxing catalyst comprising an effective amount of at least one NZ-MS selected from the group consisting of SAPO, ELAPSO, MeAPO, FeAPO, TiAPO, and ELAPO molecular sieves, and mixtures thereof, and characterized in its calcined form by an adsorption of isobutane of at least 2 percent by weight at a pressure of 500 torr and a temperature of 20° C., and further characterized in its calcined form by an adsorption of triethylamine of from zero to less than 5 percent by weight at a pressure of 2.6 torr and a temperature of 22° C.

32. The process of hydrodewaxing a hydrocarbon feedstock to reduce its pour point comprising contacting the hydrocarbon feedstock with a catalyst in the presence of hydrogen at effective hydrodewaxing conditions wherein the catalyst comprises at least one hydrogenation component in an amount effective to produce an effective hydrodewaxing catalyst and at least one NZ-MS selected from the group consisting of SAPO, ELAPSO, MeAPO, FeAPO, TiAPO, and ELAPO molecular sieves, and characterized in its calcined form by an adsorption of isobutane of at least 2 percent by weight at a pressure of 500 torr and a temperature of 20° C., and further characterized in its calcined form by an adsorption of triethylamine of from zero to less than 5 percent by weight at a pressure of 2.6 torr and a temperature of 22° C.

33. The process of claim 1, 2, 31 or 32 wherein said ELAPSO is CoAPSO, MgAPSO, MnAPSO, ZnAPSO, COMgAPSO, or CoMgMnAPSO.

34. The process of claim 3 wherein said zeolitic aluminosilicate is selected from the group consisting of zeolite Y, ultra-stable Y zeolites, zeolite X, zeolite beta, zeolite KZ-20, faujasite, LZ-210 and ZSM zeolites.

35. The process of claim 34 wherein said ZSM zeolite is selected from the group consisting of ZSM-5, ZSM-11, ZSM-12, ZSM-23, ZSM-35, ZSM-38 and ZSM-48.

36. The process of claim 3 wherein said zeolitic aluminosilicate is selected from the group consisting of zeolite Y, ultra-stable Y zeolites, zeolite X, zeolite beta, zeolite KZ-20, faujasite, LZ-210 and LZ-10.

37. The process for dewaxing a hydrocarbon to reduce its pour point comprising contacting the hydrocarbon feedstock at effective dewaxing conditions with a dewaxing catalyst comprising an effective amount of an NZ-MS selected from the group consisting of SAPO molecular sieves and an effective amount of at least one zeolitic aluminosilicate selected from the group consisting of zeolite Y, ultra-stable Y zeolites, zeolite X, zeolite beta, zeolite KZ-20, faujasite, LZ-210, LZ-10 and ZSM zeolites selected from the group consisting of ZSM-5, ZSM-11, ZSM-12, ZSM-23, ZSM-35, ZSM-38 and ZSM-48, wherein said NZ-MS is characterized in its calcined form by an adsorption of isobutane of at least 2 percent by weight and a pressure of 500 torr and a temperature of 20° C. and further characterized in its calcined form by an adsorption of triethylamine of from zero to less than 5 percent by weight at a pressure of 2.6 torr and a temperature of 22° C.

38. The process for dewaxing a hydrocarbon feedstock to reduce its pour point comprising contacting said feedstock under conditions effective to produce dewaxing with a catalyst comprising an effective amount of at least one NZ-MS selected from the group consisting of SAPO, ELAPSO, MeAPO, FeAPO, TiAPO and ELAPO molecular sieves, and characterized in its calcined form by an adsorption of isobutane of at least 2 percent by weight at a pressure of 500 torr and a temperature of 20° C., and further characterized in its calcined form by an adsorption of triethylamine of from zero to less than 5 percent by weight at a pressure of 2.6 torr and a temperature of 22° C.

39. The process of claim 38 wherein said feedstock is contacted with said catalyst in the present of hydrogen under conditions effective to produce hydrodewaxing and said catalyst further comprises at least one hydrogenation component.

40. The process of claim 38 or claim 39 wherein said at least one NZ-MS is selected from the group consisting of SAPOs.

41. The process of claim 40 wherein said NZ-MS is at least one SAPO-11 and SAPO-31.

42. The process for dewaxing a hydrocarbon feedstock to reduce its pour point comprising contacting the hydrocarbon feedstock at effective dewaxing conditions with a dewaxing catalyst comprising an effective amount of at least one NZ-MS selected from the group consisting of SAPO, ELAPSO and ELAPO molecular sieves, and characterized in its calcined form by an adsorption of isobutane of at least 2 percent by weight at a pressure of 500 torr and a temperature of 20° C., and further characterized in its calcined form by an adsorption of triethylamine from zero to less than 5 percent by weight at a pressure of 2.6 torr and a temperature of 22° C.

43. The process for hydrodewaxing a hydrocarbon feedstock to reduce its pour point comprising contacting the hydrocarbon feedstock with a catalyst in the presence of hydrogen at effective hydrodewaxing conditions wherein said catalyst comprises at least one hydrogenation component in an amount effective to provide an effective hydrodewaxing catalyst and at least one NZ-MS selected from the group consisting of SAPO, ELAPSO and ELAPO molecular sieves, and characterized in its calcined form by an adsorption of isobutane of at least 2 percent by weight at a pressure of 500 torr and a temperature of 20° C., and further characterized in its calcined form by an adsorption of triethylamine from zero to less than 5 percent by weight at a pressure of 2.6 torr and a temperature of 22° C.

* * * * *